US012748085B2

(12) United States Patent
Iijima et al.

(10) Patent No.: US 12,748,085 B2
(45) Date of Patent: Sep. 29, 2026

(54) ANALYZER AND CONTROL METHOD FOR LOCKING ANALYZER COLUMNS

(71) Applicant: Hitachi High-Tech Corporation, Tokyo (JP)

(72) Inventors: Yu Iijima, Tokyo (JP); Yusuke Shimizu, Tokyo (JP); Shuhei Yamamura, Tokyo (JP); Yushi Harada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 356 days.

(21) Appl. No.: 18/286,499

(22) PCT Filed: Feb. 3, 2022

(86) PCT No.: PCT/JP2022/004255
§ 371 (c)(1),
(2) Date: Oct. 11, 2023

(87) PCT Pub. No.: WO2022/224540
PCT Pub. Date: Oct. 27, 2022

(65) Prior Publication Data

US 2024/0192182 A1 Jun. 13, 2024

(30) Foreign Application Priority Data

Apr. 23, 2021 (JP) ................................ 2021-073538

(51) Int. Cl.
*G01N 30/60* (2006.01)
*G01N 30/02* (2006.01)
*G01N 30/46* (2006.01)

(52) U.S. Cl.
CPC ....... *G01N 30/6043* (2013.01); *G01N 30/466* (2013.01); *G01N 30/6091* (2013.01); *G01N 2030/027* (2013.01)

(58) Field of Classification Search
CPC ............ G01N 2030/027; G01N 30/46; G01N 30/466; G01N 30/6043; G01N 30/6047; G01N 30/6091
See application file for complete search history.

(56) References Cited

U.S. PATENT DOCUMENTS 5,193,703 A * 3/1993 Staats, III ............. B01D 35/02 220/240
5,603,899 A 2/1997 Franciskovich et al.
(Continued)

FOREIGN PATENT DOCUMENTS

CN 103069271 A 4/2013
DE 112013001342 T5 * 2/2015 ............ G01N 30/30
(Continued)

OTHER PUBLICATIONS

International Search Report (PCT/ISA/210) issued in PCT Application No. PCT/JP2022/004255 dated Apr. 26, 2022 with English translation (4 pages).
(Continued)

*Primary Examiner* — David L Singer
(74) *Attorney, Agent, or Firm* — Crowell & Moring LLP

(57) ABSTRACT

An analyzer capable of preventing unintended removal of a separation column is provided. A liquid chromatograph includes: a plurality of separation columns, and that are connected in parallel and removable; a plurality of analysis flow passages that are respectively connected to the plurality
(Continued)

of separation columns and configured to allow a sample to flow through each of the plurality of separation columns; a lock mechanism that is configured to restrict removal of the separation columns and other than the separation column to be removed; and a control device that is configured to control the lock mechanism.

13 Claims, 19 Drawing Sheets

(56) References Cited

U.S. PATENT DOCUMENTS

| | | | | |
|---|---|---|---|---|
| 2008/0102443 | A1 | 5/2008 | Fukuda et al. | |
| 2010/0154207 | A1* | 6/2010 | Ford | G01N 30/6004 29/700 |
| 2012/0175289 | A1* | 7/2012 | Bystron | B01D 15/10 33/700 |
| 2013/0161244 | A1 | 6/2013 | Ishii et al. | |
| 2013/0206653 | A1* | 8/2013 | Brann | B01L 3/545 210/198.2 |
| 2016/0231296 | A1* | 8/2016 | Dressler | G01N 30/8658 |
| 2019/0115695 | A1* | 4/2019 | Miyamura | H01R 13/64 |
| 2019/0317061 | A1 | 10/2019 | Nakagawa et al. | |
| 2020/0025727 | A1 | 1/2020 | Hasegawa et al. | |
| 2023/0349868 | A1* | 11/2023 | Ando | G01N 30/88 |

FOREIGN PATENT DOCUMENTS

| | | | |
|---|---|---|---|
| JP | 6-102266 | A | 4/1994 |
| JP | 7-244034 | A | 9/1995 |
| JP | 2007-78436 | A | 3/2007 |
| JP | 2008-116244 | A | 5/2008 |
| JP | 6611398 | B2 | 11/2019 |
| WO | WO 2018/116432 | A1 | 6/2018 |

OTHER PUBLICATIONS

Japanese-language Written Opinion (PCT/ISA/237) issued in PCT Application No. PCT/JP2022/004255 dated Apr. 26, 2022 with English translation (6 pages).

Extended European Search Report issued in European Application No. 22790216.0 dated Mar. 31, 2025 (6 pages).

Chinese-language Office Action issued in Chinese Application No. 202280026828.7 dated Nov. 4, 2025, with English translation (18 pages).

* cited by examiner

| LIGHT EMITTING PATTERN | | | CONTENT |
|---|---|---|---|
| A |  | OFF | WHEN CONNECTED SEPARATION COLUMN 115 IS IN USE |
| B | 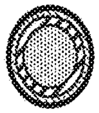 BLINKING | GREEN BLINKING | WHEN OPERATION IS WAITED FOR UNTIL USER PRESSES LED SWITCH 201 AT TIME OF REPLACEMENT OF SEPARATION COLUMN 115 |
| C | 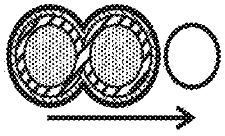 DOUBLE BLINKING | GREEN DOUBLE BLINKING | WHEN REMOVAL OR ATTACHMENT OPERATION OF SEPARATION COLUMN 115 IS PERFORMED (OPERATED BY USER) |
| D | 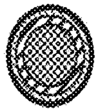 HIGH-SPEED BLINKING | GREEN HIGH-SPEED BLINKING | WHEN SYSTEM ALARM IS ISSUED |
| E | 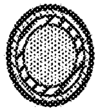 | GREEN LIGHTING | WHEN LIQUID CHROMATOGRAPH 100 IS OPERATED DURING REPLACEMENT OPERATION OF SEPARATION COLUMN 115 |

FIG. 8

| STEP | STEP S1 | STEP S2 | STEP S3 | STEP S4 | STEP S5 | STEP S6 |
|---|---|---|---|---|---|---|
| LIGHT EMITTING PATTERN | A | E | (E) | D | B | (B) |

| STEP | STEP S7 | STEP S8 | STEP S9 | STEP S10 | STEP S11 | STEP S12 |
|---|---|---|---|---|---|---|
| LIGHT EMITTING PATTERN | E | E | (E) | D | C | A |

FIG. 9

| STEP | STEP S21 | STEP S22 | STEP S23 | STEP S24 | STEP S25 | STEP S26 |
|---|---|---|---|---|---|---|
| LIGHT EMITTING PATTERN | C | B | (B) | E | E | (E) |

| STEP | STEP S27 | STEP S28 | STEP S29 | STEP S30 | STEP S31 | STEP S32 |
|---|---|---|---|---|---|---|
| LIGHT EMITTING PATTERN | D | (E) | (D) | E | E | A |

*FIG. 11*

ANALYZER AND CONTROL METHOD FOR LOCKING ANALYZER COLUMNS

TECHNICAL FIELD

This disclosure relates to an analyzer and a control method for the analyzer.

BACKGROUND ART

In an analyzer such as a liquid chromatograph, using a separation column filled with a bulking agent called a stationary phase, an object of analysis is separated from foreign components or a plurality of analysis objects are mutually separated. In mutual separation, the sample is injected into a liquid flow called a mobile phase in the analyzer and moves in the stationary phase (bulking agent) in the separation column. While the sample moves in the stationary phase, the object of analysis is separated according to the difference in the intensity of interaction between a group of substances in the sample and the stationary phase.

For example, the analyzer includes: a liquid delivery pump that delivers the mobile phase; a deaeration unit that removes the dissolved air in the mobile phase; a sample injection unit that injects the sample into the mobile phase; a separation column as an area for separation; a column oven that controls the temperature of the separation column; and a detector that detects the components in the column eluate. As the detector, a photometer, mass spectrometer or the like is appropriately selected according to the purpose of analysis, the sample or the like. The analyzer further includes, for example, a control device that analyzes the result of detection by the detector.

In order to improve throughput, the analyzer may include a plurality of separation columns. In this case, by switching a valve to select the separation column to be used, while some separation columns are being cleaned and equilibrated, an analysis is made in the remaining separation column. Consequently, analyses can be made continuously.

Patent Literature 1 describes "a separation column connection device that comprises: a column holder for holding a separation column; a first fitting holder for mounting a first fitting that is connected to an upstream tube and is provided with a seal part that is for connection with an upstream seal part of the separation column; a second fitting holder for mounting a second fitting that is connected to a downstream tube and is provided with a seal part that is for connection with a downstream seal part of the separation column; a main body member to which either the first fitting holder or the second fitting holder is fixed; a drive unit for moving the first fitting holder or the second fitting holder that is not fixed to the main body member, and the column holder in relation to the main body member; a guide for guiding the column holder in the direction of the movement caused by the drive unit; and an elastic body provided between the column holder and the second fitting holder".

CITATION LIST

Patent Literature

Patent Literature 1:
Japanese Patent No. 6611398 (claim 1)

SUMMARY OF INVENTION

Technical Problem

In a technology in Patent Literature 1, there is a case where, among a plurality of separation columns (FIG. 25), the remaining separation column other than some of separation columns which are targets to be removed is accidentally removed by a user during operation. Accordingly, a sample can be leaked out from an analysis flow passage.

The subject to solve the disclosure is to provide an analyzer which can prevent unintended removal of a separation column, and a control method for the analyzer.

Solution to Problem

An analyzer of the disclosure includes at least: a plurality of separation columns that are connected in parallel and are removable; and a lock mechanism that is configured to restrict removal of the separation columns other than the separation column to be removed. Other solution is described later in Description of Embodiments.

Advantageous Effects of Invention

According to this disclosure, an analyzer which can prevent unintended removal of a separation column, and a control method for the analyzer can be provided.

BRIEF DESCRIPTION OF DRAWINGS

FIG. 8 is a diagram showing light emitting patterns of an LED switch.

FIG. 9 is a diagram showing light emitting patterns of the LED switch in respective steps when the separation column is removed.

FIG. 11 is a diagram showing light emitting patterns of the LED switch in respective steps when the separation column is attached.

DESCRIPTION OF EMBODIMENTS

Hereinafter, a form for embodying the present disclosure (called an embodiment) will be described referring to drawings. In the description of one embodiment below, another embodiment applicable to the one embodiment will be also described as appropriate. The present disclosure is not limited to the one embodiment described below, but different embodiments may be combined or modifications may be arbitrarily made without significantly undermining the effects of the present disclosure. The same members are designated by the same reference signs and repeated description thereof is omitted. Furthermore, the members with the same functions are given the same names. What is shown in the figures is a schematic representation. For the convenience of graphic illustration, the configuration shown in a figure may be a modified form of the actual configuration and some members in one figure may be omitted or altered in another figure.

Figure 1:
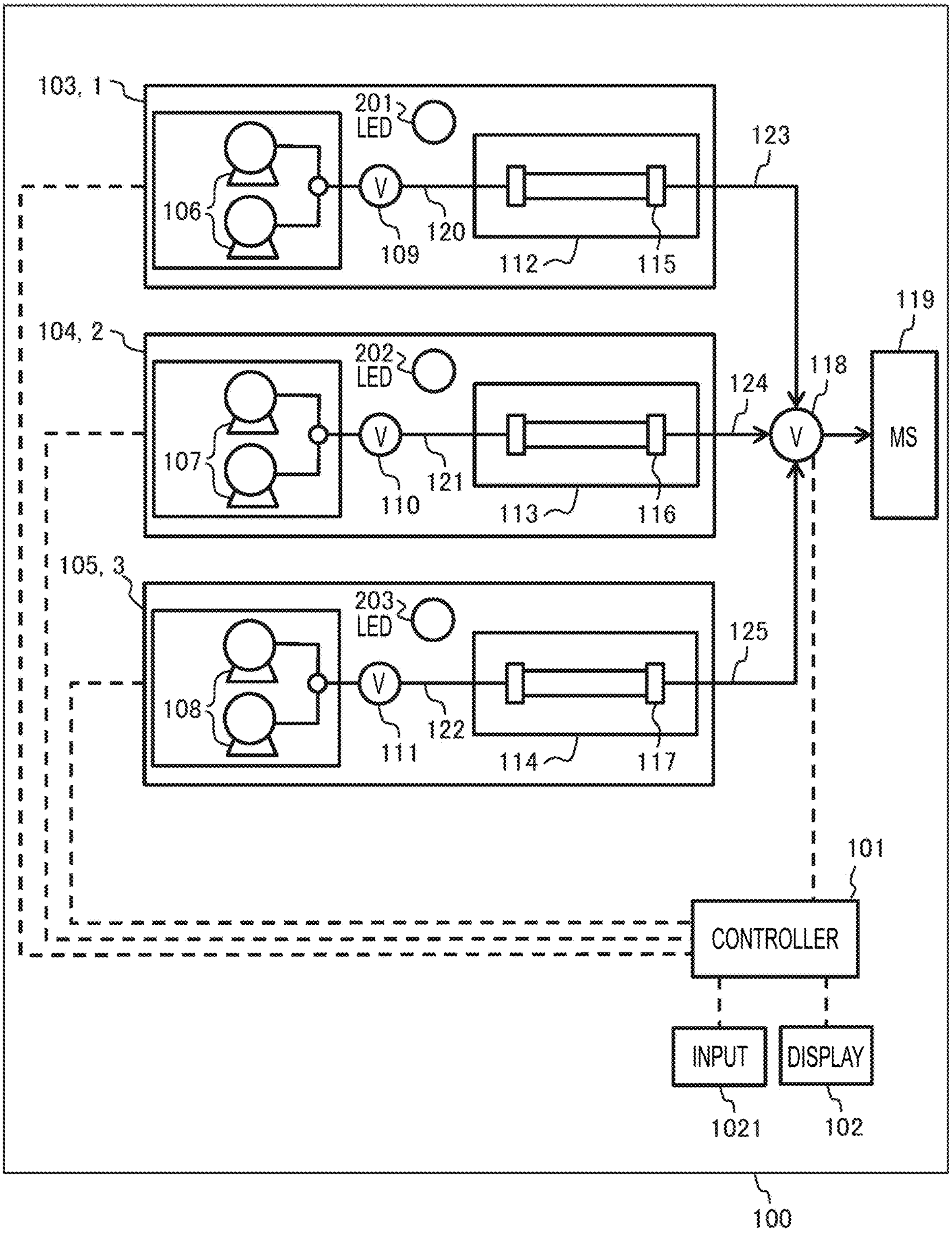
FIG. 1 is a system diagram of a liquid chromatograph according to a first embodiment.

FIG. 1 is a system diagram of a liquid chromatograph 100 according to a first embodiment. In the example described below, a liquid chromatograph is given as an example of the analyzer, but instead the analyzer may be a gas chromatograph, ultrahigh-speed liquid chromatograph, clinical test apparatus with a separation column or the like.

A liquid chromatograph 100 includes a plurality of separation units 103, 104 and 105 that are connected in parallel, and the separation units 103, 104 and 105 are respectively defined as streams 1, 2 and 3. The separation units 103, 104 and 105 are connected to one mass spectrometer (detector) 119 by a flow passage switching valve (flow passage switching unit) 118. The detector is not limited to the mass spectrometer 119, but for example, it may be a visible light ultraviolet absorbance detector, photodiode array detector or fluorescence detector or the like.

The separation units 103, 104 and 105 include removable separation columns 115, 116 and 117 respectively. Therefore, the liquid chromatograph 100 includes a plurality of separation columns 115, 116 and 117 that are connected in parallel and removable. The liquid chromatograph 100 includes a plurality of analysis flow passages 120, 121, 122, 123, 124 and 125. The analysis flow passages 120, 121, 122, 123, 124 and 125 are connected to the plurality of separation columns 115, 116 and 117 respectively and allow a sample to flow through each of the plurality of separation columns 115, 116 and 117.

The separation unit 103 includes a liquid delivery pump 106 (liquid delivery unit), a sample injection valve 109 (sample injection unit), a connection unit 112, analysis flow passages 120 and 123, and an LED switch 201. The liquid delivery pump 106 delivers liquids while changing the concentration of different solvents. The sample injection valve 109 introduces the sample into the analysis flow passage 120. The separation column 115 is installed in the connection unit 112. The analysis flow passages 120 and 123 are connected to the separation column 115 to allow the sample to flow through the separation column 115.

The separation unit 104 includes a liquid delivery pump 107 (liquid delivery unit), a sample injection valve 110 (sample injection unit), a connection unit 113, analysis flow passages 121 and 124, and an LED switch 202. The liquid delivery pump 107 delivers liquids while changing the concentration of different solvents. The sample injection valve 110 introduces the sample into the analysis flow passage 121. The separation column 116 is installed in the connection unit 113. The analysis flow passages 121 and 124 are connected to the separation column 116 to allow the sample to flow through the separation column 116.

The separation unit 105 includes a liquid delivery pump 108 (liquid delivery unit), a sample injection valve 111 (sample injection unit), a connection unit 114, analysis flow passages 122 and 125, and an LED switch 203. The liquid delivery pump 108 delivers liquids while changing the concentration of different solvents. The sample injection valve 111 introduces the sample into the analysis flow passage 122. The separation column 117 is installed in the connection unit 114. The analysis flow passages 122 and 125 are connected to the separation column 117 to allow the sample to flow through the separation column 117.

The LED switches 201, 202 and 203 (an example of a notification device) are provided in the liquid chromatograph 100 to notify of the removable separation column 115, 116 or 117 among the separation columns 115, 116 and 117. Providing the LED switches 201, 202 and 203 enables the notified user to easily know the separation column 115, 116 or 117 to be removed.

The LED switches 201, 202 and 203 have an LED lamp and a switch function. They notify of the removable separation column 115, 116 or 117, and their lighting pattern changes according to the condition of the connection units 112, 113 and 114. The LED switches 201, 202 and 203 make a notification, for example, by lighting, blinking or color variation of the LED lamp. The LED switches 201, 202 and 203 are connected to a control device 101 by an electric signal line (not shown) and located in the vicinity of the separation columns 115, 116 and 117.

The notification device is not limited to the LED switches 201, 202 and 203 but it may be a light source other than an LED lamp, a speaker that makes a sound or the like.

The liquid chromatograph 100 includes a control device 101 and the control device 101 controls operation of the separation units 103, 104 and 105, flow passage switching valve 118 and mass spectrometer 119. Furthermore, the control device 101 controls a lock mechanism 200 (FIG. 3) which will be described later in detail. The control device 101 includes, for example, a CPU (Central Processing Unit), RAM (Random Access Memory), ROM (Read Only Memory) and the like. The control device 101 is embodied when the given control program stored in the ROM is extracted in the RAM and executed by the CPU.

The liquid chromatograph 100 includes a display device 102 (an example of the notification device) connected to the control device 101 and the display device 102 displays different kinds of information such as the result of analysis and information related to the progress of analysis. As well as the LED switches 201, 202 and 203, the display device 102 makes a notification of the removable separation column 115, 116 or 117 among the separation columns 115, 116 and 117.

The liquid chromatograph 100 includes an input device 1021 to release the restriction on sliding by the lock mechanism 200 (FIG. 3) when it is connected to the control device 101 and operated with the separation columns 115, 116 and 117 in place. Since the input device 1021 is provided, the user can operate the input device 1021 to release the restriction on sliding so that the separation columns 115, 116 and 117 can be connected to the analysis flow passages 123, 124 and 125, which will be described later in detail.

Figure 2:
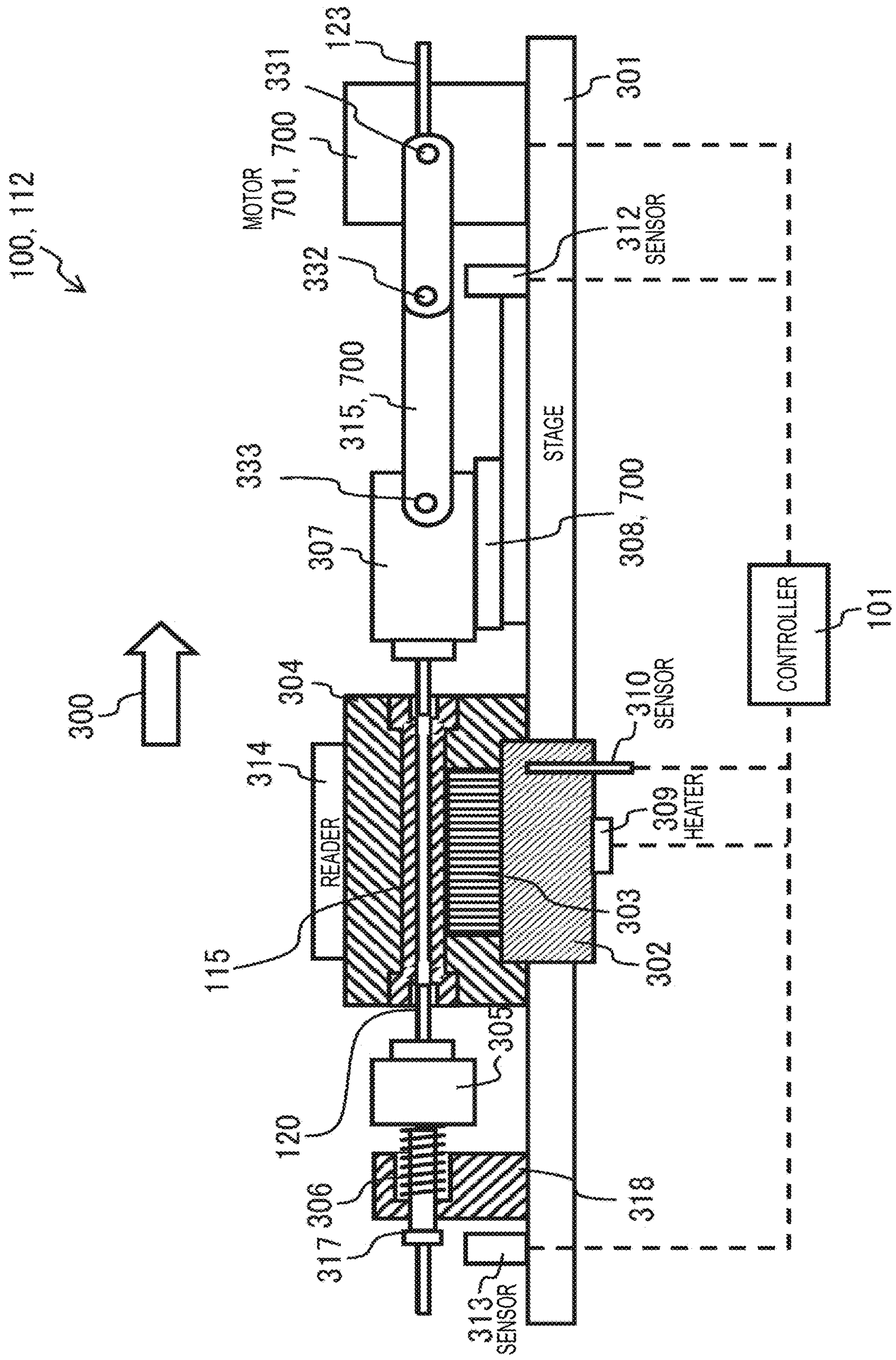
FIG. 2 is a diagram showing a separation column when removed, and shows a state in which an analysis flow passage and a separation column are connected to each other.
Figure 5:
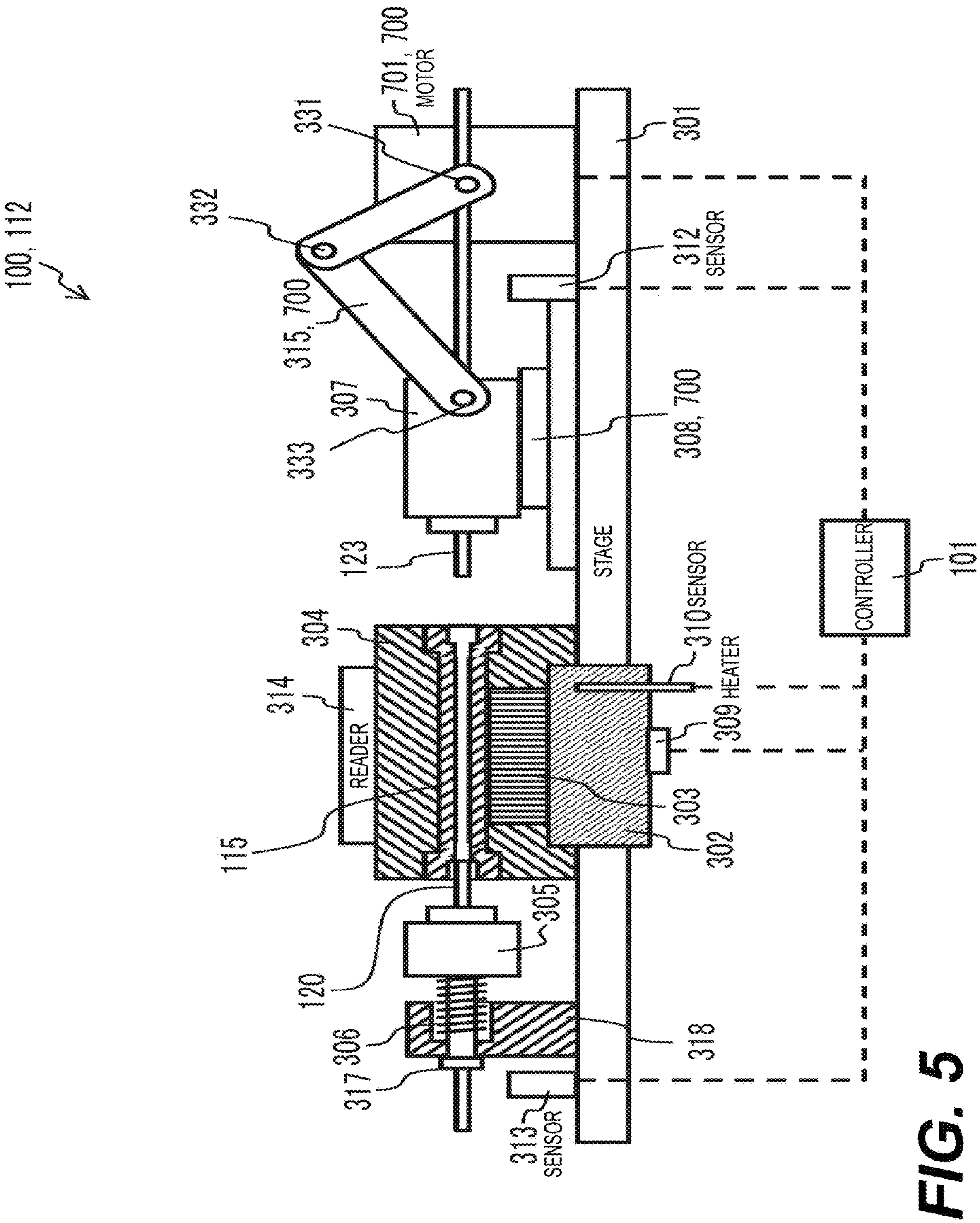
FIG. 5 is a diagram showing the separation column when removed, and shows a state in which the analysis flow passage is slid by release of a lock mechanism.
Figure 6:
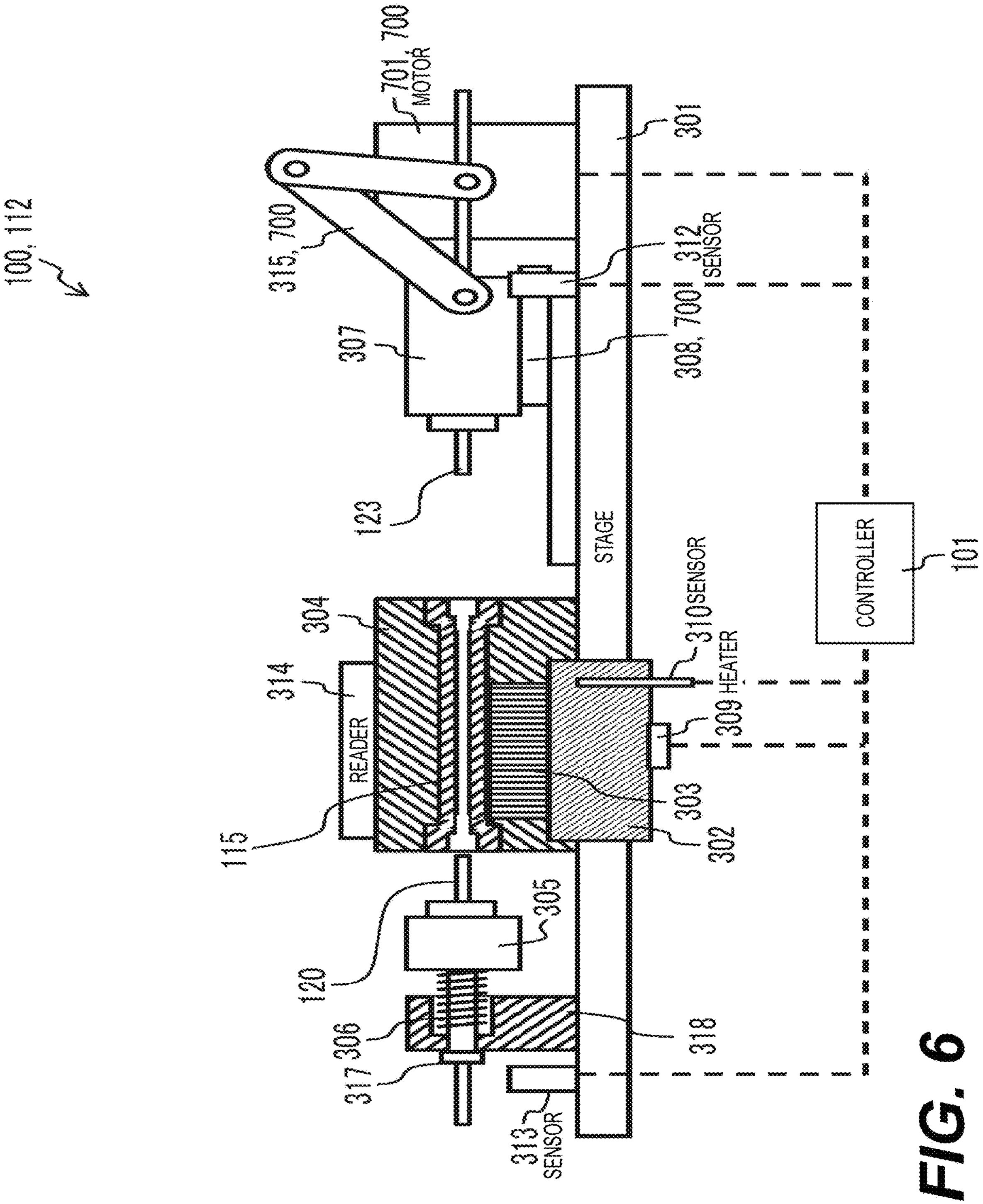
FIG. 6 is a diagram showing the separation column when removed, and shows a state in which the analysis flow passage is locked in a state in which lock is released.

FIG. 2 is a diagram that explains the removal of the separation column 115 in which the analysis flow passages 120 and 123 are connected to the separation column 115. FIG. 2 shows the connection unit 112, and the connection units 113 and 114 have the same configuration as the connection unit 112 except the separation columns 116 and 117 are provided instead of the separation column 115. Since the separation columns 116 and 117 can be installed and removed in the same way as shown in FIG. 2, FIG. 5 and FIG. 6, explanation of installation and removal of the separation columns 116 and 117 is omitted. In this specification, a slide mechanism 700 slides the analysis flow passage 123, but instead a slide mechanism (not shown) that slides the separation column 115 may be provided.

The sample moves inside the analysis flow passages 120 and 123 in the direction of arrow 300 and enters the separation column 115 through the analysis flow passage 120 and exits the separation column 115 through the analysis flow passage 123. Therefore, the analysis flow passages 120 and 123 are connected to one end (entrance) and the other end (exit) of the separation column 115 respectively.

In the liquid chromatograph 100, the connection unit 112 includes a stage 301, a heat block 302, a column heat block 303, a column cartridge 304, fitting holders 305 and 307, a compression spring 306, a heating device 309, a temperature sensor 310, a slide mechanism 700, an open detection sensor 312, a connection detection sensor 313, a reading device 314, and a support base 318.

The column heat block 303, located in an opening (not shown) made in the column cartridge 304, comes into contact with the heat block 302. Specifically, the heat block 302 comes into contact with the separation column 115 through the column heat block 303 located in the opening (not shown) formed in the column cartridge 304. The heating device 309 heats the separation column 115. The temperature sensor 310 measures the temperature of the separation column 115. The temperature sensor 310 measures the temperature of the heat block 302, but instead it may measure any of the heat block 302, column heat block 303 and separation column 115.

Figure 3:
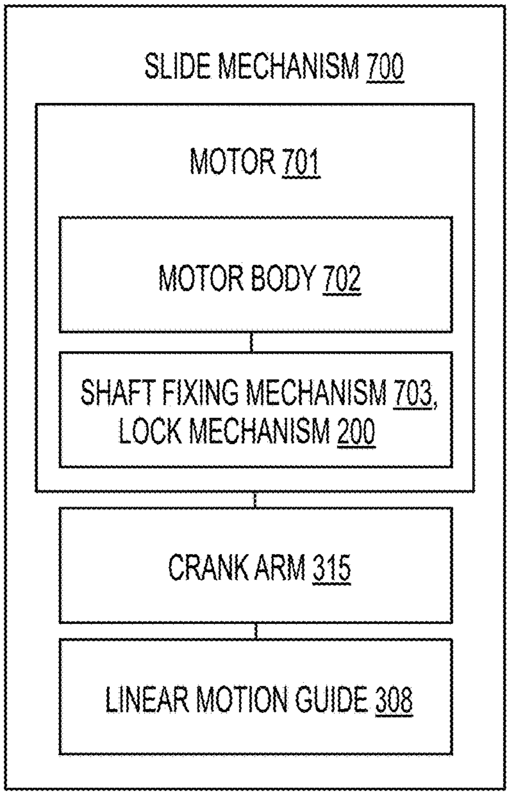
FIG. 3 is a block diagram of a slide mechanism.

FIG. 3 is a block diagram of the slide mechanism 700. Regarding the separation column 115 or analysis flow passage 123 as a structure, the slide mechanism 700 connects the separation column 115 and the analysis flow passage 123 by sliding the analysis flow passage 123 (the other structure) with respect to the placed separation column 115 (one structure). Since the slide mechanism 700 is provided, by sliding at least one of the separation column 115 and analysis flow passage 123, they can be connected. In the example shown in the figure, the slide mechanism 700 slides the analysis flow passage 123.

The slide mechanism 700 includes a motor 701, a crank arm 315, and a linear motion guide 308. The motor 701 is connected to the analysis flow passage 123 through the flexing crank arm 315, and the crank arm 315 converts the rotation driving force of the motor 701 into a propulsive force to slide the analysis flow passage 123 toward the separation column 115. Since the motor 701 is provided, the analysis flow passage 123 can be slid using the motor 701, so the burden on the user can be reduced.

For example, the rotation speed, torque, rotation timing, etc. of the motor 701 are controlled by the control device 101. If the motor 701 is expected to be small (power saving), a speed reduction mechanism (not shown) may be installed between the motor 701 and crank arm 315 so that even the small motor 701 can produce a large force.

The motor 701 includes a motor body 702 to rotate a rotation driving shaft (not shown) and a shaft fixing mechanism 703 to fix the rotation driving shaft as a lock mechanism 200 when the power to the motor body 702 is turned off. Even when the power to the motor body 702 is turned off, the rotation driving shaft can rotate, but since the shaft fixing mechanism 703 is provided, the rotation driving shaft can be fixed when the power is turned off, so that sliding of the analysis flow passage 123 can be restricted. In the first embodiment, the shaft fixing mechanism 703 fixes the rotation driving shaft of the motor body 702 connected to the separation columns 116 and 117. This keeps the connection of the separation columns 116 and 117 with the analysis flow passage 123 and thereby prevents unintended removal of the separation columns 116 and 117.

The lock mechanism 200 restricts the removal of the separation columns 116 and 117 other than the separation column 115 to be removed (FIG. 1). During the work for replacement of the separation column 115, whereas the lock mechanism 200 allows the removal of the separation column 115 as the object of removal, the separation columns 116 and 117, which are not objects of removal, are locked. This prevents unintended removal of the separation columns 116 and 117.

The lock mechanism 200 restricts the slide mechanism 700 from sliding the analysis flow passage 123. Consequently, during locking by the lock mechanism 200, the connection between the separation column 115 and the analysis flow passage 123 is prevented from being released, thereby preventing unintended removal of the separation column 115.

Figure 4:
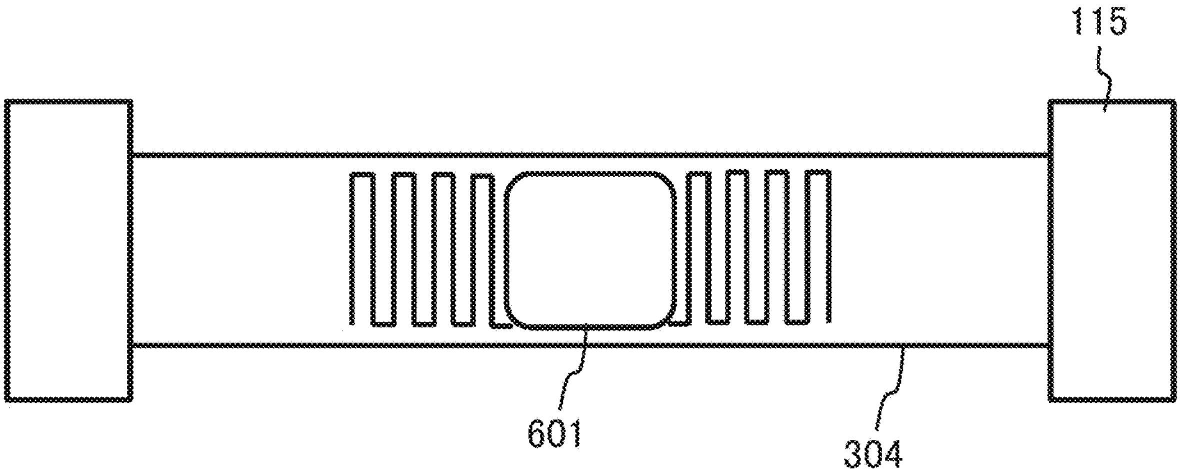
FIG. 4 is a diagram showing a medium for identifying the separation column.

FIG. 4 is a diagram that explains a medium 601 for identifying the separation column 115. The liquid chromatograph 100 includes a reading device 314 (FIG. 2) that reads the information recorded in the medium 601, including the information for identifying the installed separation column 115. Since the reading device 314 is provided, the separation column 115 can be identified so that an installation error, etc. can be prevented. Similarly, the separation columns 116 and 117 include a medium (not shown) though not shown.

In the example shown in the figure, the medium 601 is attached to the side face of the column cartridge 304 containing the separation column 115, but instead it may be directly attached to the separation column 115. For example, the medium 601 may be a one-dimensional code, two-dimensional code, sign, RFID tag or the like, or for example, the separation column 115 may be identified according to the unique number recorded in the medium 601 and a database (not shown) showing the relation between the number stored in the control device 101 (FIG. 1) and identification information.

In the example shown in the figure, the medium 601 is an RFID tag as an identifier. The medium 601 is read while the separation column 115 is placed. When replacing the separation column 115, the reading device 314 reads various information such as the type of the separation column 115 to which the medium 601 is attached, manufacturing number, and in which connection unit 112, 113 or 114 (FIG. 1) it is installed. The control device 101 obtains the usage count of the separation column 115 and makes a notification of the time to replace, through the display device 102. When replacing the separation column 115, a record indicating that it has been used is written in the medium 601 attached to the separation column 115 being replaced, thereby preventing it from being reused.

The open detection sensor 312 (second sensor) detects non-connection of the analysis flow passage 123 to the downstream side as the other end side of the separation column 115. The connection detection sensor 313 (first sensor) detects connection of the analysis flow passage 120 to the upstream side as the one end side of the separation column 115. Although the concrete configuration of the open detection sensor 312 and connection detection sensor 313 is arbitrary, for example, they may be an optical sensor capable of detecting a structure through shielding, reflection, etc. of light irradiated from a lower side to an upper side.

The open detection sensor 312 detects the fitting holder 307 integrated with the analysis flow passage 123. In the example shown in the figure, since the fitting holder 307 does not exist above the open detection sensor 312, the open detection sensor 312 does not detect it (non-detection). On the other hand, the open detection sensor 312 detects the fitting holder 307 when the fitting holder 307 is placed at the remotest position from the separation column 115, which will be detailed later referring to FIG. 6. This detection means that the release of the connection between the separation column 115 and the analysis flow passage 123 is detected.

The connection detection sensor 313 detects a shaft 317 protruding laterally from the support base 318 as the separation column 115 moves leftward on the plane of paper. In the example shown in the figure, the separation column 115 and the analysis flow passage 123 are on the same axis. Therefore, the shaft 317, located laterally to the separation column 115, pushes the compression spring 306 and protrudes laterally from the support base 318. As a result, the connection detection sensor 313 detects the shaft 317 and detects the connection between the separation column 115 and the analysis flow passage 123.

The control device 101 (FIG. 1) performs restriction by the lock mechanism 200 when the open detection sensor 312 or connection detection sensor 313 makes a detection. This means that sliding is restricted both during disconnection and during connection. Consequently, during disconnection, it is easy to remove the separation column 115 and during connection, unintended removal of the separation column 115 can be prevented. In the example shown in the figure, the open detection sensor 312 is in the disconnection state and the connection detection sensor 313 is in the detection state, so locking is performed by the lock mechanism 200.

FIG. 5 is a diagram that explains the removal of the separation column 115 in which the analysis flow passage 123 is slid by releasing the lock mechanism 200. In this condition, the fitting holder 307 does not exist above the open detection sensor 312 and the open detection sensor 312 is in the non-detection state. On the other hand, the shaft 317 does not protrude leftward of the support base 317 due to the restoring force of the compression spring 306, and the connection detection sensor 313 is in the non-detection state. Therefore, since the connection detection sensor 313 and open detection sensor 312 are both in the non-detection state, restriction by the lock mechanism 200 is not performed. Due to unlock by the lock mechanism 200, the rotation driving shaft of the motor body 702 (FIG. 3) can rotate.

By energizing (turning on the power to) the motor body 702 (FIG. 3) with the lock mechanism 200 (FIG. 3) released, the connection between the separation column 115 and the analysis flow passage 123 is released. Consequently, the separation column 115 and the analysis flow passage 123 are separated and the separation column 115 can be removed from the liquid chromatograph 100, which will be detailed later referring to FIG. 7. In the example shown in the figure, by turning on the power to the motor body 702 (FIG. 3), the analysis flow passage 123 slides in the direction of going away from the separation column 115. Consequently, the connection between the separation column 115 and the analysis flow passage 123 is released.

FIG. 6 is a diagram that explains the removal of the separation column 115 in which the analysis flow passage 123 is locked with the lock released. As the analysis flow passage 123 slides in the direction of going away from the separation column 115, eventually the linear motion guide 308 reaches the remotest point as far as it can slide. With this, sliding by the slide mechanism 700 is stopped. Also, the open detection sensor 312 detects the linear motion guide 308 and detects disconnection. On the other hand, the connection detection sensor 313 is in the non-detection state like the above case described in reference to FIG. 5. Therefore, since the open detection sensor 312 is in the detection state, restriction on sliding by the lock mechanism 200 is performed. Consequently, the analysis flow passage 123 is locked at the remotest position from the separation column 115, so the separation column 115 can be removed without an influence of the analysis flow passage 123.

As explained above, furthermore, the lock mechanism 200 (FIG. 3) restricts the analysis flow passage 123 from sliding in a state that the separation column 115 and the analysis flow passage 123 are disconnected, as shown in FIG. 6. Since sliding of the analysis flow passage 123 is restricted with the separation column 115 and the analysis flow passage 123 disconnected, the separation column 115 can be easily removed.

The procedure of installing the separation column 115 is opposite to the above procedure. Specifically, in the condition as shown in FIG. 6, the user replaces the separation column 115 and pushes one end of the new separation column 115 against the analysis flow passage 120. Then, the slide mechanism 700 slides the analysis flow passage 123 in the direction of coming close to the separation column 115 as shown in FIG. 6, FIG. 5 and FIG. 2 in the order of mention. Consequently, the separation column 115 and the analysis flow passage 123 can be connected.

Figure 7:
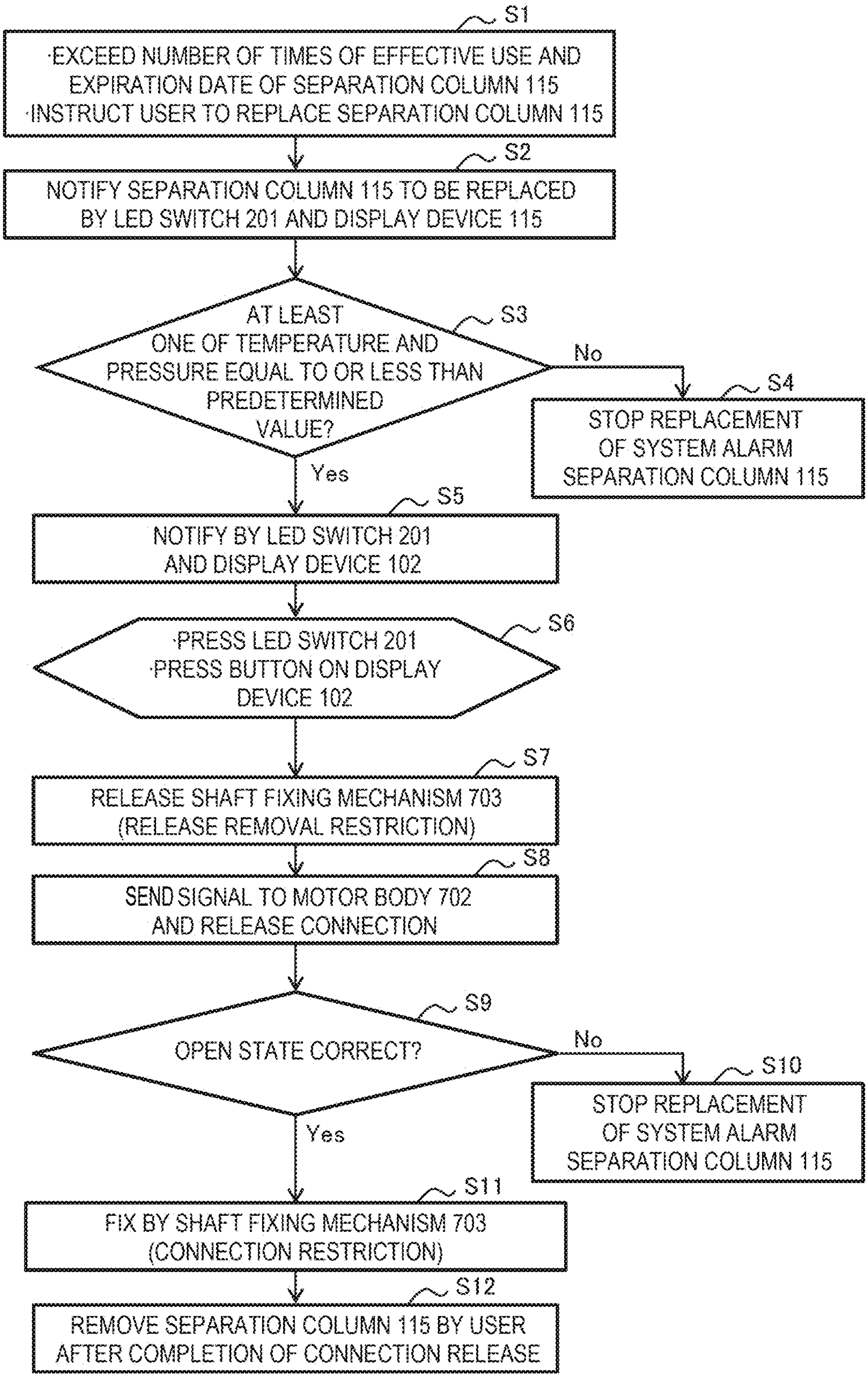
FIG. 7 is a flowchart showing a method of removing the separation column.

FIG. 7 is a flowchart that explains the method of removing the separation column 115 (control method for the analyzer). The separation columns 116 and 117 (FIG. 1) can be removed in the same way as shown in FIG. 7. FIG. 7 will be explained referring to FIG. 1 as appropriate. The method of removing the separation column 115 includes Steps S1 to S12.

The control device 101 shows on the display device 102 that the separation column 115 should be replaced according to the number of times of effective use and expiration date of the separation column 115 and so on (Step S1). Alternatively, the user instructs the control device 101 to replace the separation column 115 by giving an instruction to the input device 1021 (Step S1). The control device 101 notifies the user of the separation column 115 to be removed, through at least either the LED switch indicating the connection unit 112 or the display device 102 (Step S2).

Next, upon detection of an end of an analysis in the separation column 115 as a trigger, the control device 101 releases the restriction on removal by the lock mechanism 200 (FIG. 3). This makes it possible to remove the separation column 115 upon an end of an analysis, so the time to remove the separation column 115 can be grasped by detection of an end of an analysis.

Specifically, the control device 101 releases the restriction on removal by the lock mechanism 200 (FIG. 3) when at least either the temperature of the separation column 115 or the inner pressure of at least one of the analysis flow passage 120 and the separation column 115 is equal to or less than a predetermined value (Step S3). As the temperature, for example, the value measured by the temperature sensor 310 (FIG. 2) can be used.

The control device 101 releases the restriction on removal by the lock mechanism 200 (FIG. 3) when the temperature of the separation column 115 is equal to or less than the predetermined value (first half of Step S3). This makes it possible that when the temperature of the separation column 115 which has risen due to the heating device 309 (FIG. 3) during operation, drops due to stop of heating upon an end of an analysis, the end of the analysis can be grasped according to the temperature of the separation column 115. Consequently, the removal can be performed at an adequate time. Also, since the restriction is released at a temperature not more than the predetermined value, for example, such as a temperature at which the worker can touch easily, the worker can easily do the removal work.

Furthermore, for example, the control device 101 releases the restriction on removal by the lock mechanism 200 when the inner pressure of at least either the analysis flow passage 120 or the separation column 115 is equal to or less than the predetermined value (latter half of Step S3). This makes it possible that when the inner pressure which has become high during operation, of at least either the analysis flow passage 120 or the separation column 115 drops due to an end of an analysis, the end of the analysis can be grasped according to the pressure, so the removal can be performed at an adequate time. For example, when the restriction is released at a pressure not more than the predetermined value, for example, near to the atmospheric pressure, unintended sample leakage from at least either the analysis flow passage 120 or the separation column 115 can be properly prevented. The inner pressure of at least either the analysis flow passage 120 or the separation column 115 can be measured, for example, as the pressure of the liquid delivery pump 106 as shown in the figure.

If at Step S3 a decision as "abnormal" is made because the predetermined value is exceeded, replacement of the separation column 115 should be stopped and the control device 101 makes a notification as a system alarm through at least either the LED switch 201 or the display device 102 (Step S4). On the other hand, if at Step S3 a decision as "normal" is made because the predetermined value is not exceeded, the control device 101 makes a notification to the user through at least either the LED switch 201 or the display device 102 (Step S5). Consequently, the user can know the separation column 115 to be replaced.

The user presses the LED switch 201 or presses the button on the display device 102 (Step S6). Consequently, the control device 101 releases the shaft fixing mechanism 703 (FIG. 3) as the lock mechanism 200 (FIG. 3) (Step S7). The control device 101 sends an electric signal to the motor body 702 (FIG. 3) to turn on the power and releases the connection between the separation column 115 and the analysis flow passage 123 (Step S8). After releasing the connection, the control device 101 decides whether the open state is correct or not (Step S9). Concretely, when the open detection sensor 312 detects disconnection of the analysis flow passage 123, the control device 101 decides that the open state is correct. If not correct (No), the replacement of the separation column 115 is stopped in the same way as the above Step S4 (Step S10).

On the other hand, if the open state is correct (Yes), the control device 101 drives the shaft fixing mechanism 703 as the lock mechanism 200 (FIG. 3) (Step S11, lock step). Consequently, the rotation driving shaft of the motor body 702 (FIG. 3) is fixed to restrict sliding. Step S11 is a step in which, among the plurality of removable separation columns 115, 116 and 117, the lock mechanism 200 restricts the removal of the separation columns 116 and 117 other than the separation column 115 to be removed. Then, the release of the connection is completed and the user can remove the separation column 115 (Step S12).

FIG. 8 is a diagram that explains light emitting patterns of the LED switch 201. In Step S1 to Step S12 (FIG. 7), one of the light emitting patterns A to E shown in FIG. 8 is selected to emit light. The light emitting pattern A is a pattern in which the light is turned off. The light emitting pattern A is used while the connected separation column 115 is in use. The light emitting pattern B is, for example, green blinking (the color of the LED switch 201 is not limited to green. The same is true for the other patterns). The light emitting pattern B is used, at the replacement of the separation column 115, during the period of waiting for the user to press the LED switch 201.

The light emitting pattern C is, for example, green double blinking (the light blinks twice successively and then turns off). The light emitting pattern C is used while the user is doing replacement work for removal and installation of the separation column 115 (explained later). The light emitting pattern D is, for example, green high-speed blinking. The light emitting pattern D is used when a system alarm is issued. The light emitting pattern E is green lighting. The light emitting pattern E is used when the liquid chromatograph 100 (FIG. 1) is in operation in the work to replace the separation column 115.

FIG. 9 is a diagram that explains the light emitting pattern of the LED switch 201 in each of Steps S1 to S12 to remove the separation column 115. The light emitting pattern A is used for Steps S1 and S12. The light emitting pattern B is used for Step S5. The light emitting pattern C is used for Step S11. The light emitting pattern D is used for Steps S4 and S10. The light emitting pattern E is used for Steps S2, S7 and S8.

For Step S3, the light emitting pattern E used for Step S2 is successively used. For Step S6, the light emitting pattern B used for Step S5 is successively used. For Step S9, the light emitting pattern E used for Step S8 is successively used.

Figure 10:
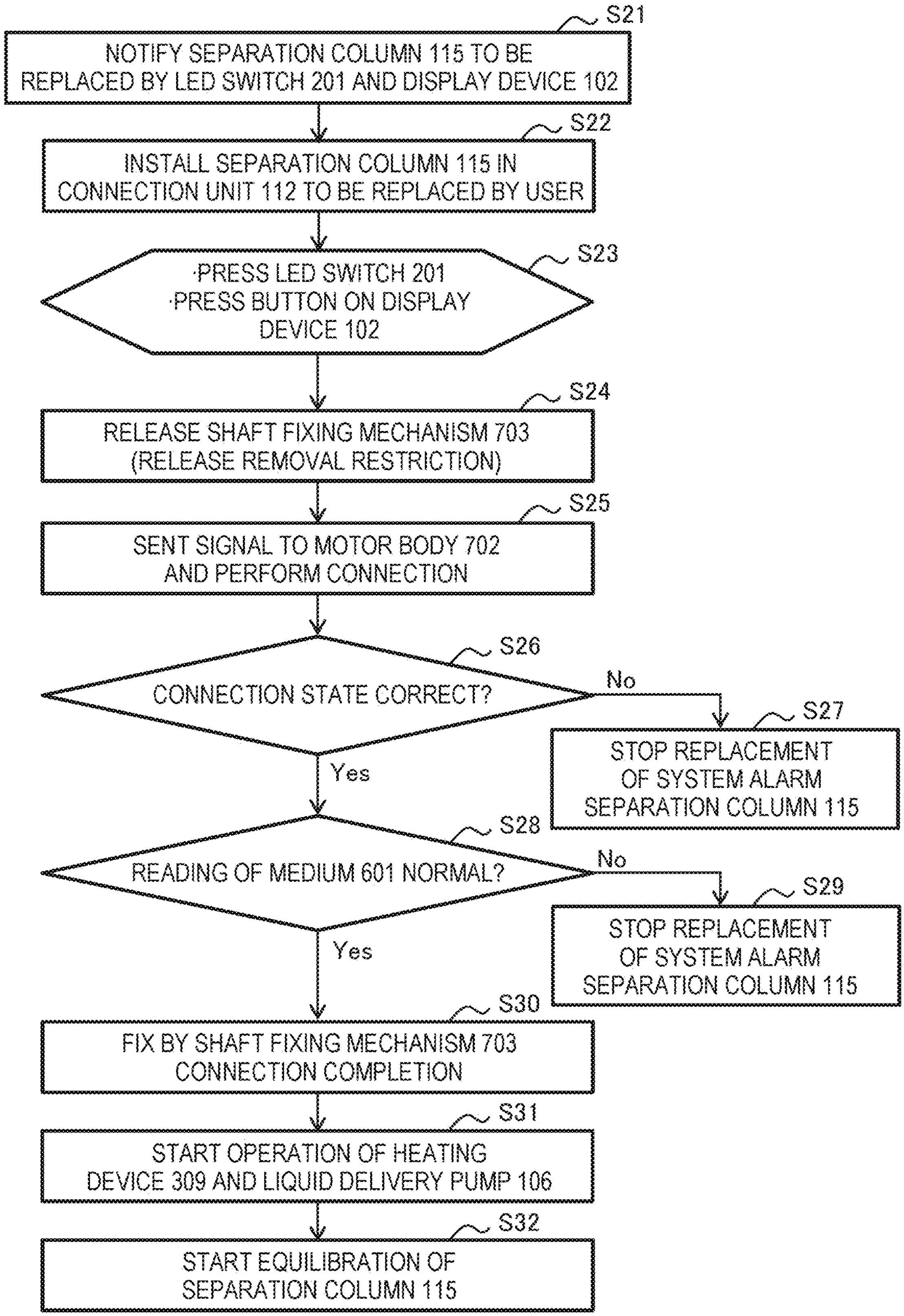
FIG. 10 is a flowchart showing a method of attaching the separation column.

FIG. 10 is a flowchart that explains the method of installing the separation column 115. The separation columns 116 and 117 (FIG. 1) can be installed in the same way as shown in FIG. 10. FIG. 10 will be explained referring to FIG. 1 as appropriate. The method of installing the separation column 115 includes Steps S21 to S32.

The control device 101 notifies the user of the separation column 115 to be installed through at least either the corresponding LED switch 201 or the display device 102 (Step S21). At this time, the separation column 115 is not installed in the connection unit 112 yet. Also, the shaft fixing mechanism 703 (FIG. 3) restricts sliding by the slide mechanism 700 (FIG. 2). The user installs the separation column 115 in the connection unit 112 for replacement (Step S22). After completion of installation, the user at least presses either the LED switch 201 or presses the button (not shown) on the display device 102 (Step S23). Consequently, the control device 101 releases the fixing by the shaft fixing mechanism 703 (FIG. 3) (Step S24). With this, the control device 101 sends an electric signal to the motor body 702 (FIG. 3) to turn on the power and thereby starts sliding the analysis flow passage 123 toward the separation column 115 (Step S25).

The control device 101 decides whether the connection state is correct or not (Step S26). Specifically, when the connection detection sensor 313 (FIG. 2) detects the connection of the analysis flow passage 123, the control device 101 decides that the connection state is correct. If not correct (No), the replacement of the separation column 115 is stopped (Step S27) in the same way as at the above Step S4. On the other hand, if correct (Yes), the control device 101 decides whether reading of the medium 601 (FIG. 3) of the separation column 115 is normal or not (Step S28). If the reading is not normal, for example, that is, the detection result is not as prescribed or the medium 601 cannot be correctly read (No), the replacement of the separation column 115 is stopped (Step S29) in the same way as at the above Step S4. On the other hand, if correct (Yes), the control device 101 causes the shaft fixing mechanism 703 (FIG. 3) to perform fixing to fix the connection (Step S30). Consequently, the connection between the separation column 115 and the analysis flow passage 123 is completed.

Next, the control device 101 causes the heating device 309 (FIG. 2) and liquid delivery pump 106 (FIG. 1) to start operation (Step S31) and starts equilibration of the separation column 115 (Step S32).

FIG. 11 is a diagram that explains the light emitting pattern of the LED switch 201 in each of the Steps S21 to S32 (FIG. 10) to install the separation column 115. The light emitting patterns A to E shown in FIG. 11 are the same as the light emitting patterns A to E shown in FIG. 8.

The light emitting pattern A is used for Step S32. The light emitting pattern B is used for Step S22. The light emitting pattern C is used for Step S21. The light emitting pattern D is used for Step S27. The light emitting pattern E is used for Steps S24, S25, S30, S31 and S32.

For Step S23, the light emitting pattern B used for Step S22 is successively used. For Step S26, the light emitting pattern E used for Step S25 is successively used. For Step S28, the light emitting pattern D used for Steps S25 and S26 is successively used. For Step S29, the light emitting pattern D used for Steps S27 and S28 is successively used.

In the motor shown in FIG. 11 of the above Patent Literature 1, the rotation driving shaft can rotate when the power is off. However, according to the liquid chromatograph 100 in the first embodiment, after the separation columns 115, 116 and 117 are installed, the installed separation columns 115, 116 and 117 can be fixed using the shaft fixing mechanism 703 (lock mechanism 200) of the motor 701 (FIG. 3). This prevents unintended driving of the motor body 702 and prevents unintended removal of the separation columns 115, 116 and 117.

Figure 12:
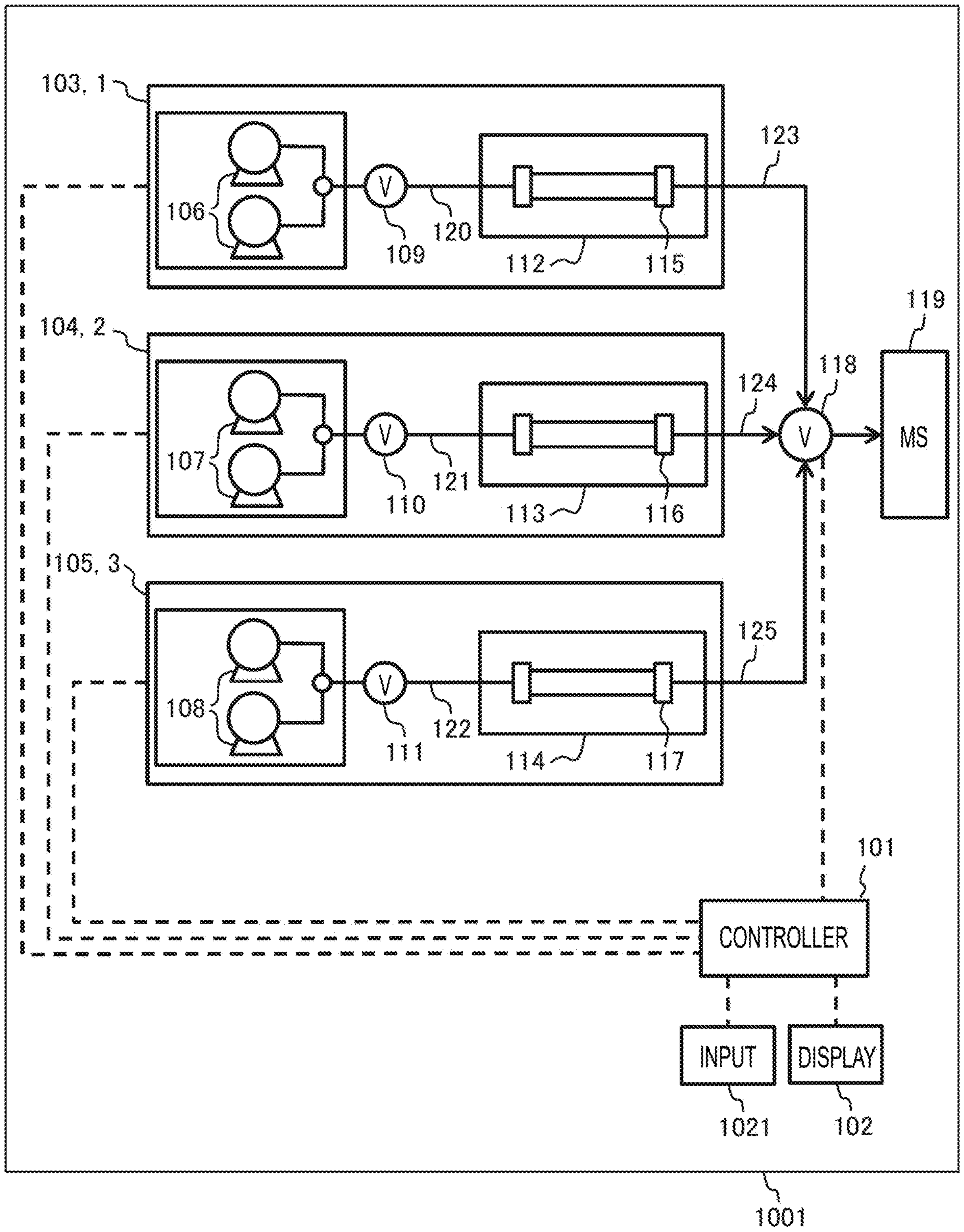
FIG. 12 is a system diagram of a liquid chromatograph according to a second embodiment.

FIG. 12 is a system diagram of a liquid chromatograph 1001 according to the second embodiment. The liquid chromatograph 1001 is the same as the liquid chromatograph 100 (FIG. 1) except that the LED switches 201, 202 and 203 (FIG. 1) are not provided. The liquid chromatograph 1001 includes a display device 102 as a notification device and displays the same content as described above referring to FIG. 8, on the display device 102.

The technique described in the above Patent Literature 1 does not mention that the removal state is displayed. However, according to the liquid chromatograph 1001 in the second embodiment, the user can work while grasping the content displayed on the display device 102, so the user can work easily. Furthermore, since the information can be given to the user through the display device 102, the user's understanding about his/her work can be supported by increasing the amount of information to be displayed on the display device 102. In addition, the number of components can be decreased.

Figure 13:
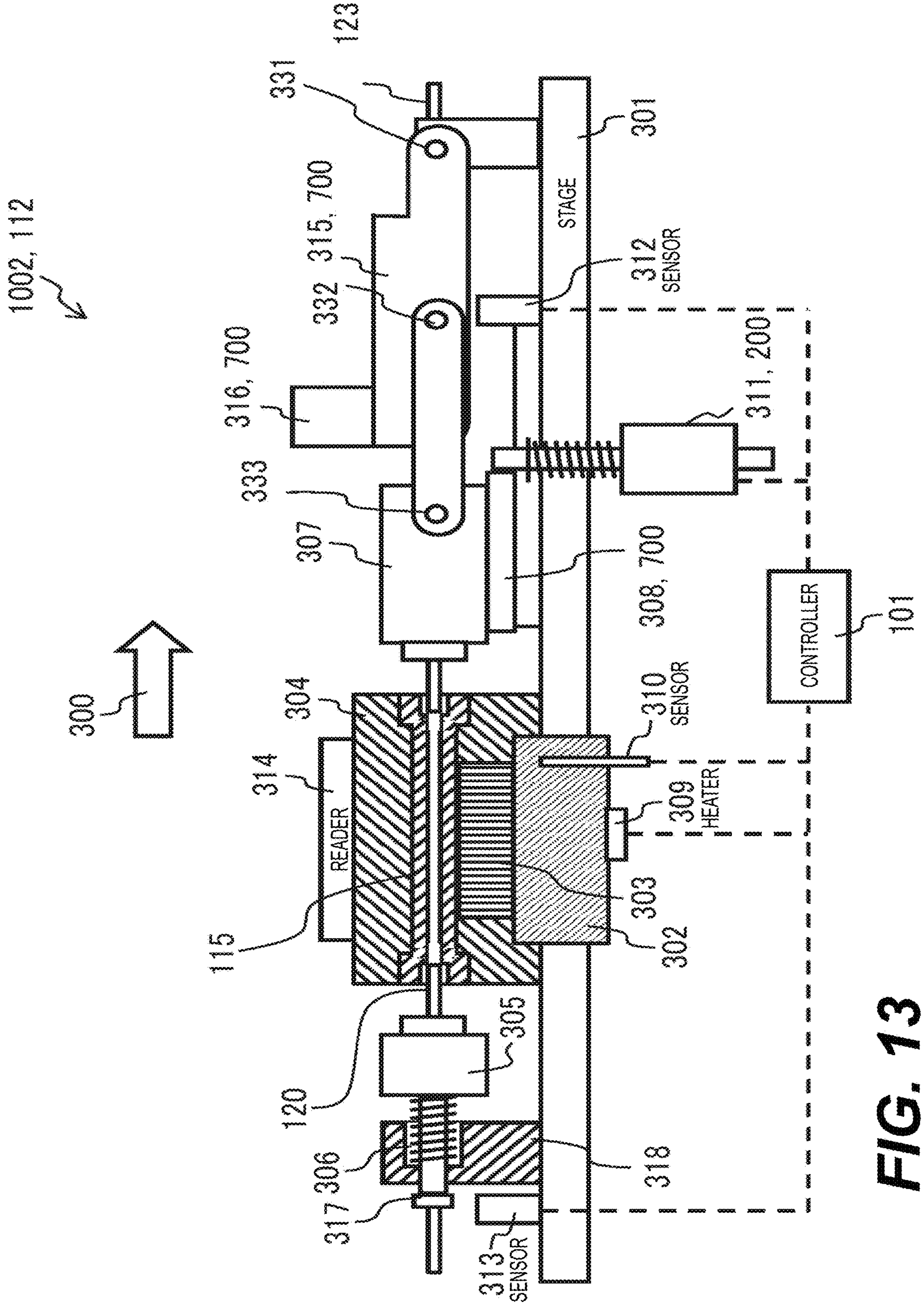
FIG. 13 is a diagram showing a separation column when removed, and shows a state in which an analysis flow passage and a separation column are connected to each other in a liquid chromatograph according to a third embodiment.

FIG. 13 is a diagram that explains the removal of the separation column 115 in a liquid chromatograph 1002 according to the third embodiment, in which the analysis flow passage 123 and the separation column 115 are connected to each other. Installation work can be carried out as shown in FIG. 15, FIG. 14 and FIG. 13 in the order of mention, which will be explained later.

The liquid chromatograph 1002 includes, as the lock mechanism 200, a solenoid lock 311 instead of the shaft fixing mechanism 703 (FIG. 3). Also, the slide mechanism 700 of the liquid chromatograph 1002 further includes a lever 316 to slide the analysis flow passage 123 (the other structure) through operation by the user. The liquid chromatograph 1002 is the same as the liquid chromatograph 100 (FIG. 1) except these points.

The solenoid lock 311 is located on the separation column 115 side of the linear motion guide 308 integrated with the analysis flow passage 123. The solenoid lock 311 protrudes on the lateral end side (opposite to the separation column 115) of the linear motion guide 308 at the power off. This restricts sliding by the slide mechanism 700. On the other hand, the solenoid lock 311 retracts downward on the other end side of the linear motion guide 30 at the power on, which releases the restriction on sliding of the analysis flow passage 123. Therefore, the solenoid lock 311 makes it possible to control whether or not to allow the analysis flow passage 123 to slide, by turning on or off the power.

Figure 14:
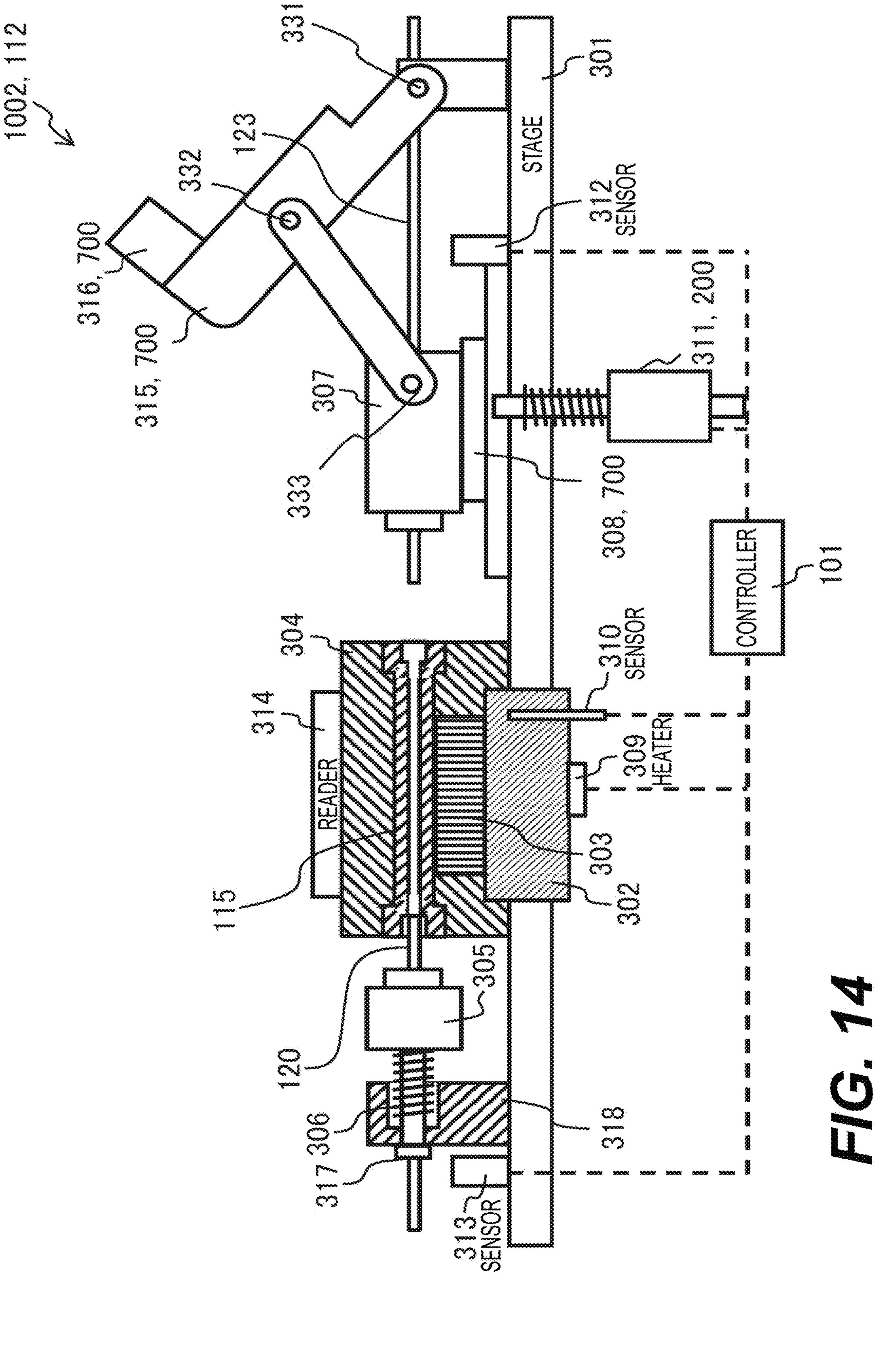
FIG. 14 is a diagram showing the separation column when removed, and shows a state in which the analysis flow passage is slid by pulling up a lever in the liquid chromatograph according to the third embodiment.
Figure 15:
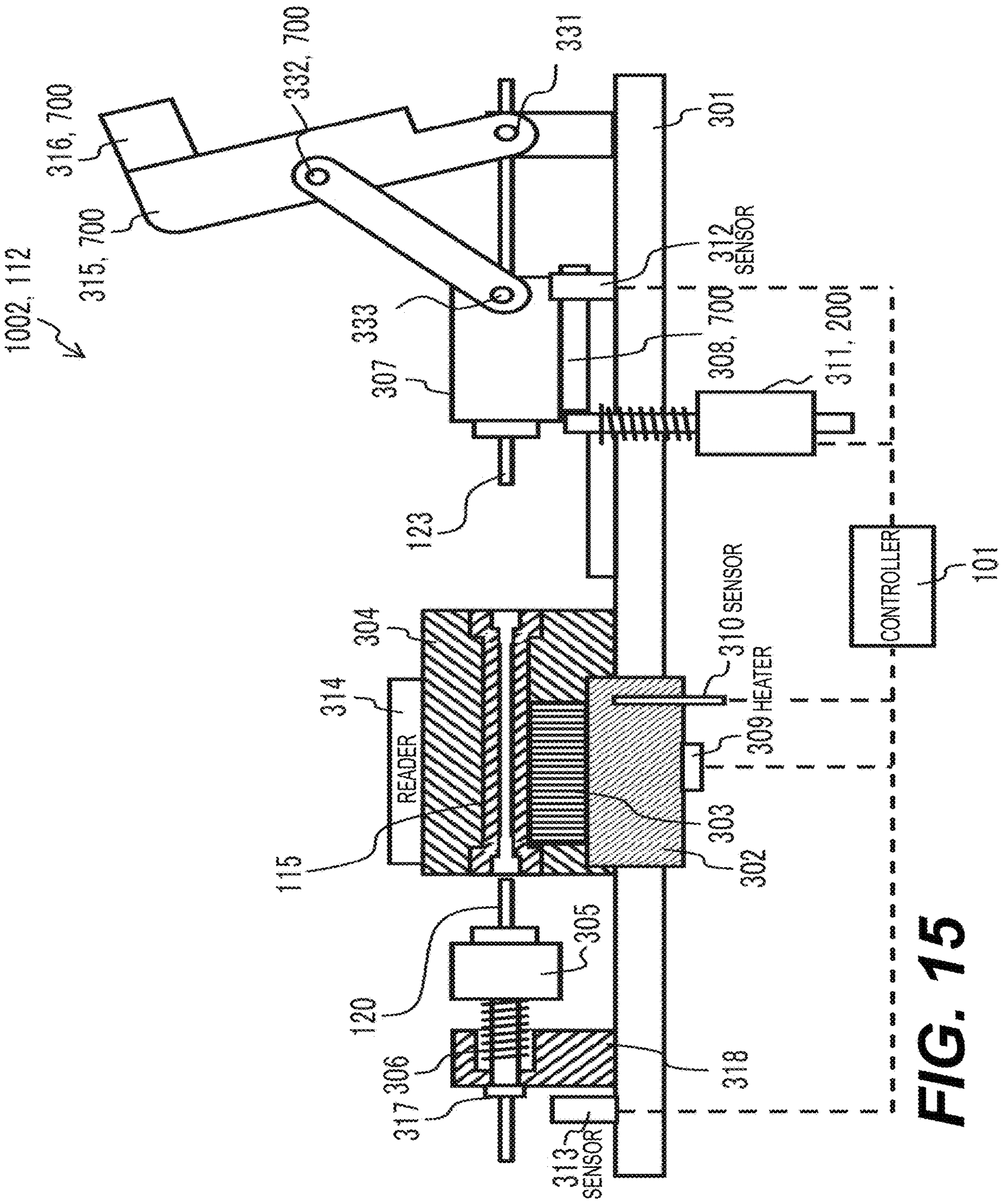
FIG. 15 is a diagram showing the separation column when removed, and shows a state in which the analysis flow passage is locked in a state in which connection is released in the liquid chromatograph according to the third embodiment.

FIG. 14 is a diagram that explains the removal of the separation column 115 in the liquid chromatograph 1002 according to the third embodiment, in which the analysis flow passage 123 is slid by pulling up the lever 316. The lever 316 is integrated with the crank arm 315. By pulling up the lever 316, the direction of the force is changed by rotation of the rotation shafts 331, 332 and 333 so that the analysis flow passage 123 slides in the direction of going away from the separation column 115. The lever 316 makes it possible that the user can slide the analysis flow passage 123 through a simple structure.

When the power to the solenoid lock 311 is turned on, the restriction on sliding of the analysis flow passage 123 is released as mentioned above. When the user pulls up the lever 316 in this condition, the analysis flow passage 123 slides in the direction of going away from the separation column 115 as shown in FIG. 14. At this time, the open detection sensor 312 is in the non-detection state and the connection detection sensor 313 is also in the non-detection state.

FIG. 15 is a diagram that explains the removal of the separation column 115 in the liquid chromatograph 1002 according to the third embodiment, in which the analysis flow passage 123 is locked in a state that the connection is released. As the user fully pulls up the lever 316, the open detection sensor 312 detects the fitting holder 307.

Consequently, the solenoid lock 311 protrudes and the linear motion guide 308 is fixed on the separation column 115 side of the linear motion guide 308. On the other hand, due to the restoring force of the compression spring 306, the shaft 317 does not protrude outward from the support base 318. This causes the connection detection sensor 313 to be in the non-detection state.

Figure 16:
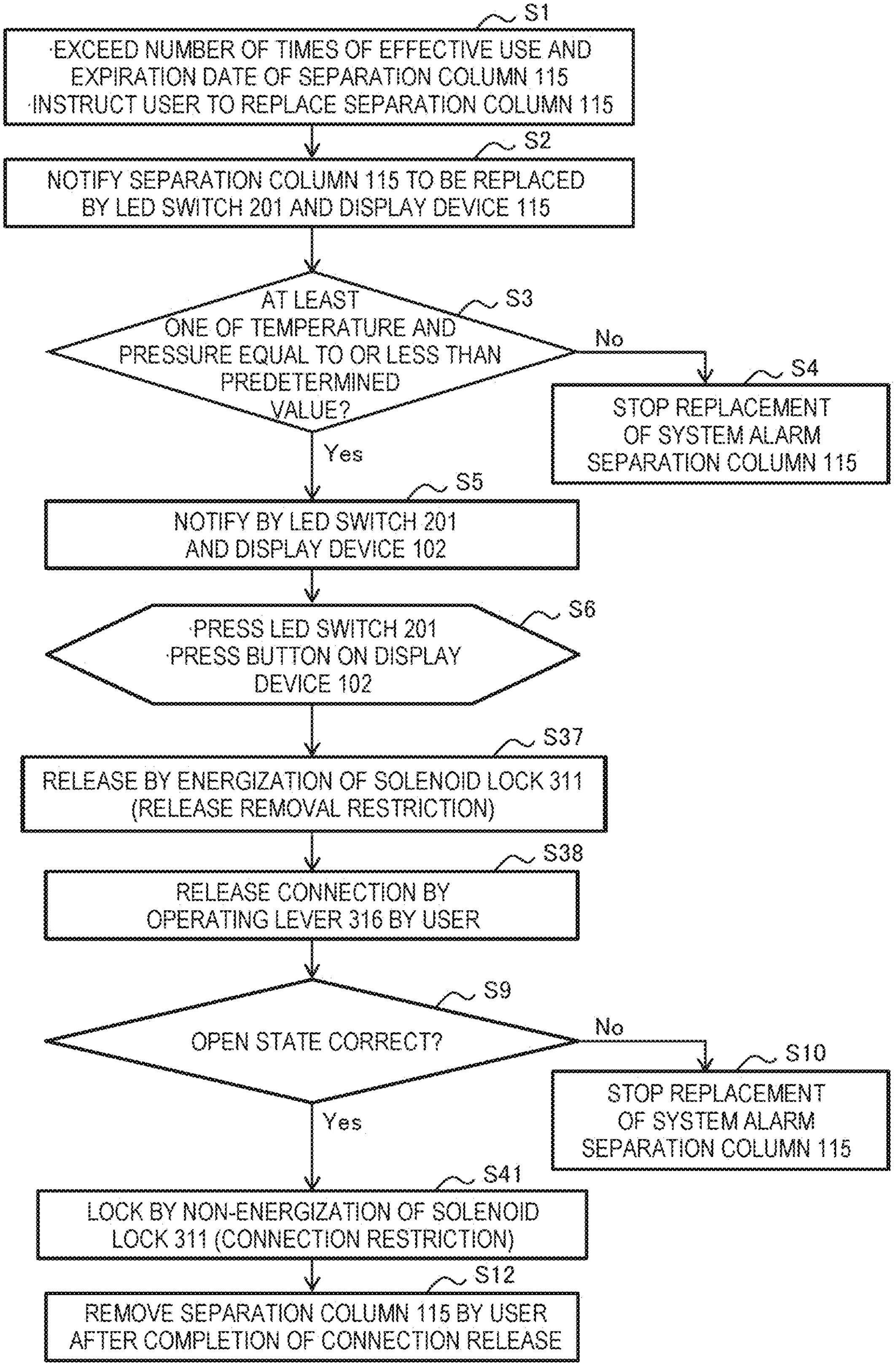
FIG. 16 is a flowchart showing a method of removing the separation column in the liquid chromatograph according to the third embodiment.

FIG. 16 is a flowchart that explains the method of removing the separation column 115 in the liquid chromatograph 1002 according to the third embodiment. The steps in FIG. 16 that are the same as the steps in FIG. 7 are designated by the same step numbers and their description is omitted.

After Steps S1 to S6 are carried out, the control device 101 (FIG. 1) releases locking by the lock mechanism 200 (FIG. 13) by turning on the power to the solenoid lock 311 of the connection unit 112 (Step S37, equivalent to Step S7 (FIG. 7)). Then, the user pulls up the lever 316 to release the connection between the analysis flow passage 123 and the separation column 115 (Step S38, equivalent to Step S8 (FIG. 7)). Then, after Steps S9 and S10 are carried out, the control device 101 (FIG. 1) turns off the power to the solenoid lock 311 of the connection unit 112 so that locking by the lock mechanism 200 is performed (Step S41, equivalent to Step S11 (FIG. 7)). This can prevent unintended sliding of the analysis flow passage 123 during removal of the separation column 115. Lastly, Step S12 is carried out.

Figure 17:
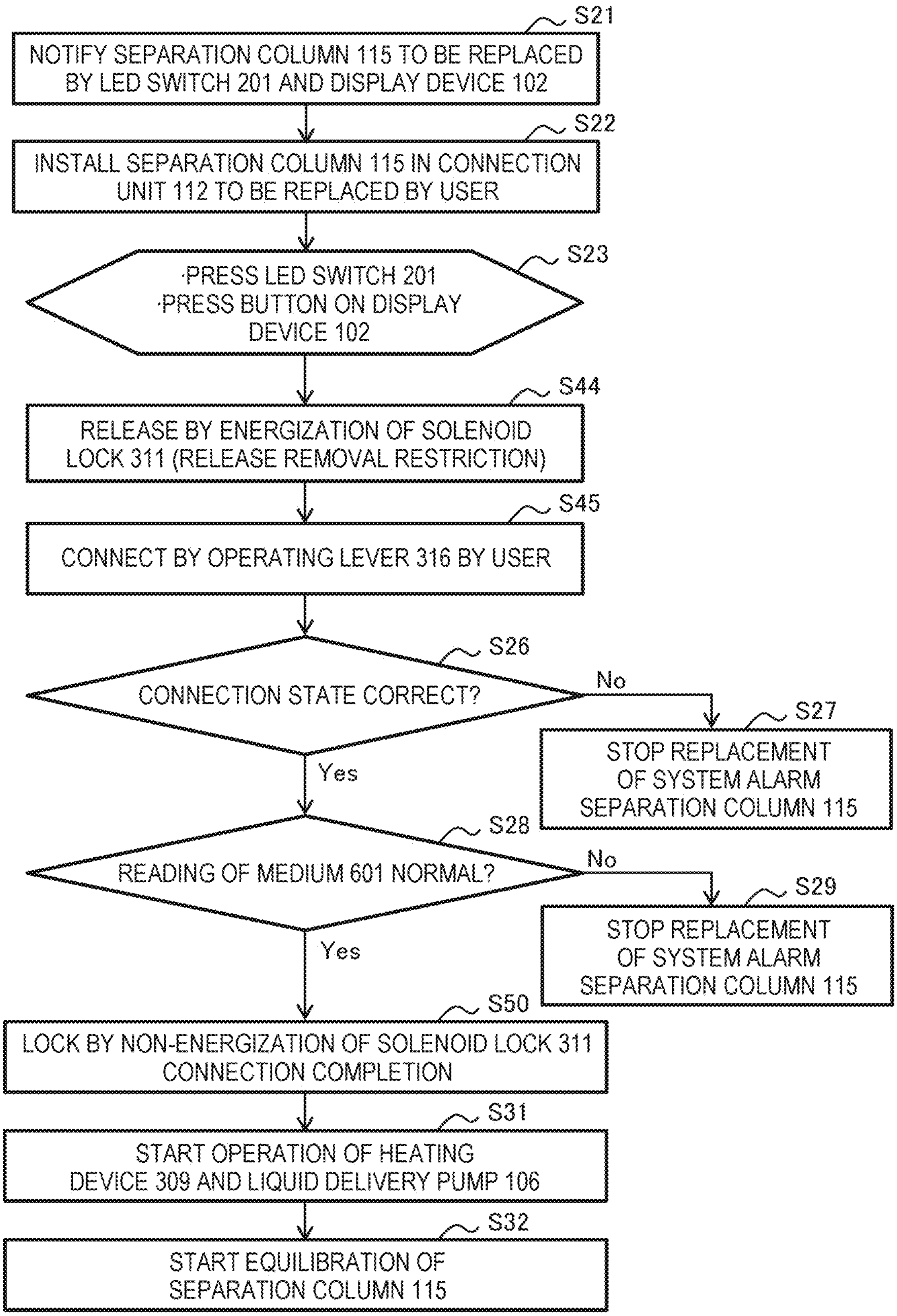
FIG. 17 is a flowchart showing a method of attaching the separation column in the liquid chromatograph according to the third embodiment.

FIG. 17 is a flowchart that explains the method of installing the separation column 115 in the liquid chromatograph 1002 according to the third embodiment. In FIG. 17, the steps that are the same as the steps in FIG. 10 are designated by the same step numbers and their description is omitted.

After Steps S21 to S23 are carried out, the control device 101 (FIG. 1) releases locking by the lock mechanism 200 (FIG. 13) by turning on the power to the solenoid lock 311 of the connection unit 112 (Step S44, equivalent to Step S24 (FIG. 10)). Then, the user pushes down the lever 316 to connect the analysis flow passage 123 and the separation column 115 (Step S45, equivalent to Step S25 (FIG. 10)). Then, after Steps S26 to S29 are carried out, the control device 101 (FIG. 1) turns off the power to the solenoid lock 311 of the connection unit 112 so that locking by the lock mechanism 200 is performed (Step S50, equivalent to Step S30 (FIG. 10)). This fixes the connection between the analysis flow passage 123 and the separation column 115 and can prevent unintended removal of the separation column 115. Then, Steps S31 and S32 are carried out.

The technique described in the above Patent Literature 1 does not mention the concrete method of removing the separation column. However, according to the liquid chromatograph 1002 in the third embodiment, unintended removal of the separation column 115 by the use of the lever 316 can be prevented by using the solenoid lock 311 as the lock mechanism 200. In addition, the use of the solenoid lock 311, which is locked when the power is off, offers a fail-safe function. Furthermore, since the lever 316 is used for sliding, the system configuration can be simplified.

Figure 18:
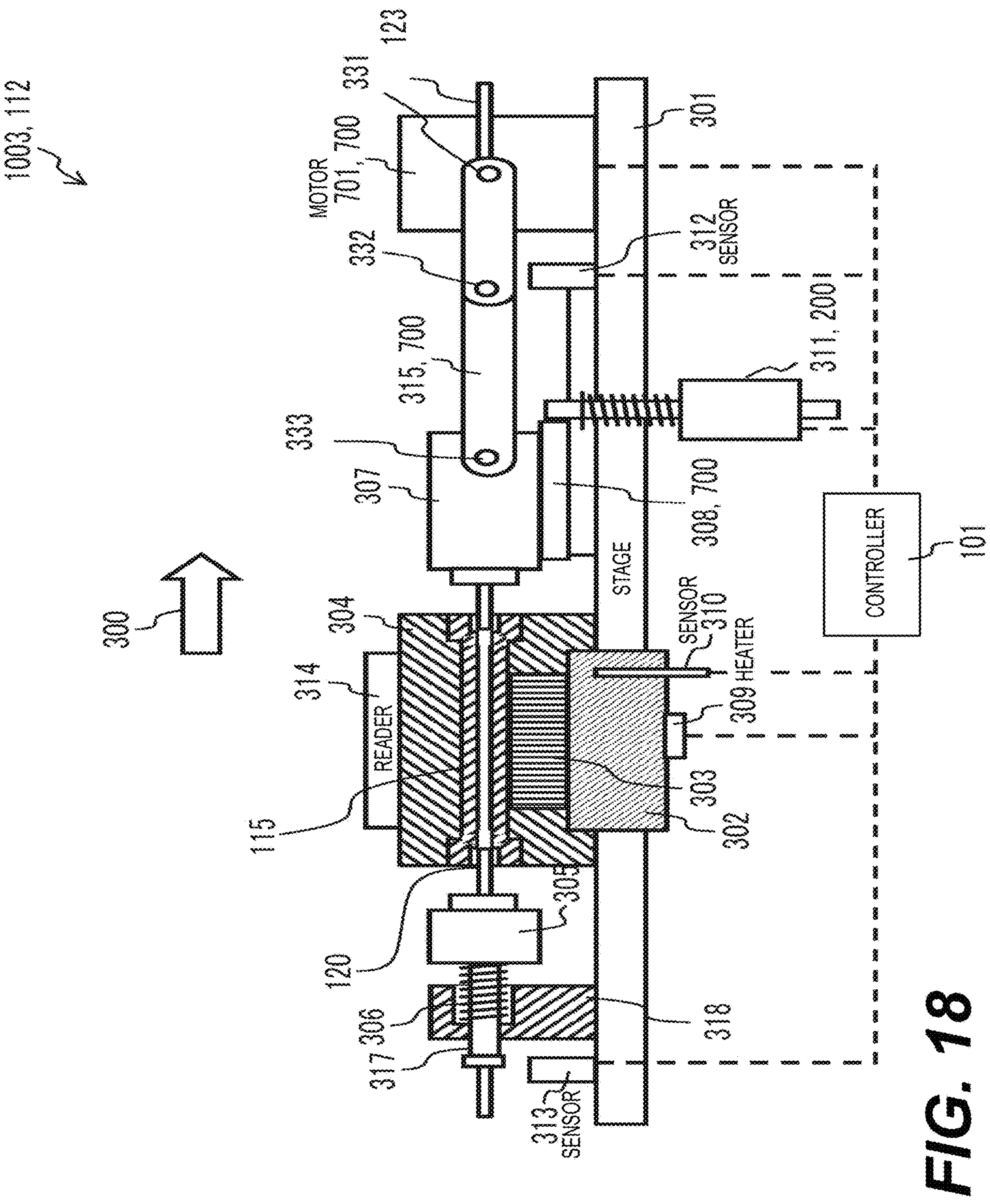
FIG. 18 is a diagram showing a separation column when removed, and shows a state in which an analysis flow passage and a separation column are connected to each other in a liquid chromatograph according to a fourth embodiment.

FIG. 18 is a diagram that explains the removal of the separation column 115 in the liquid chromatograph 1003 according to the fourth embodiment, in which the analysis flow passage 123 and the separation column 115 are connected to each other. Installation work can be done as shown in FIG. 20, FIG. 19 and FIG. 18 in the order of mention, which will be explained later.

The liquid chromatograph 1003 is the same as the liquid chromatograph 100 (FIG. 1) except that the solenoid lock 311 is provided instead of the shaft fixing mechanism 703 (FIG. 3). Since the rotation driving shaft (not shown) of the motor body 702 of the motor 701 in the liquid chromatograph 1003 does not have the shaft fixing mechanism 703, it can rotate when the power is off. Therefore, when the solenoid lock 311 locks the linear motion guide 308 integrated with the analysis flow passage 123, sliding is restricted. This prevents unintended releasing of the connection, and prevents unintended removal of the separation column 115.

The solenoid lock 311 is driven in the same way as in the third embodiment. For example, when the solenoid lock 311 protrudes on the separation column 115 side of the linear motion guide 308, the analysis flow passage 123 is restricted from sliding toward the separation column 115.

Figure 19:
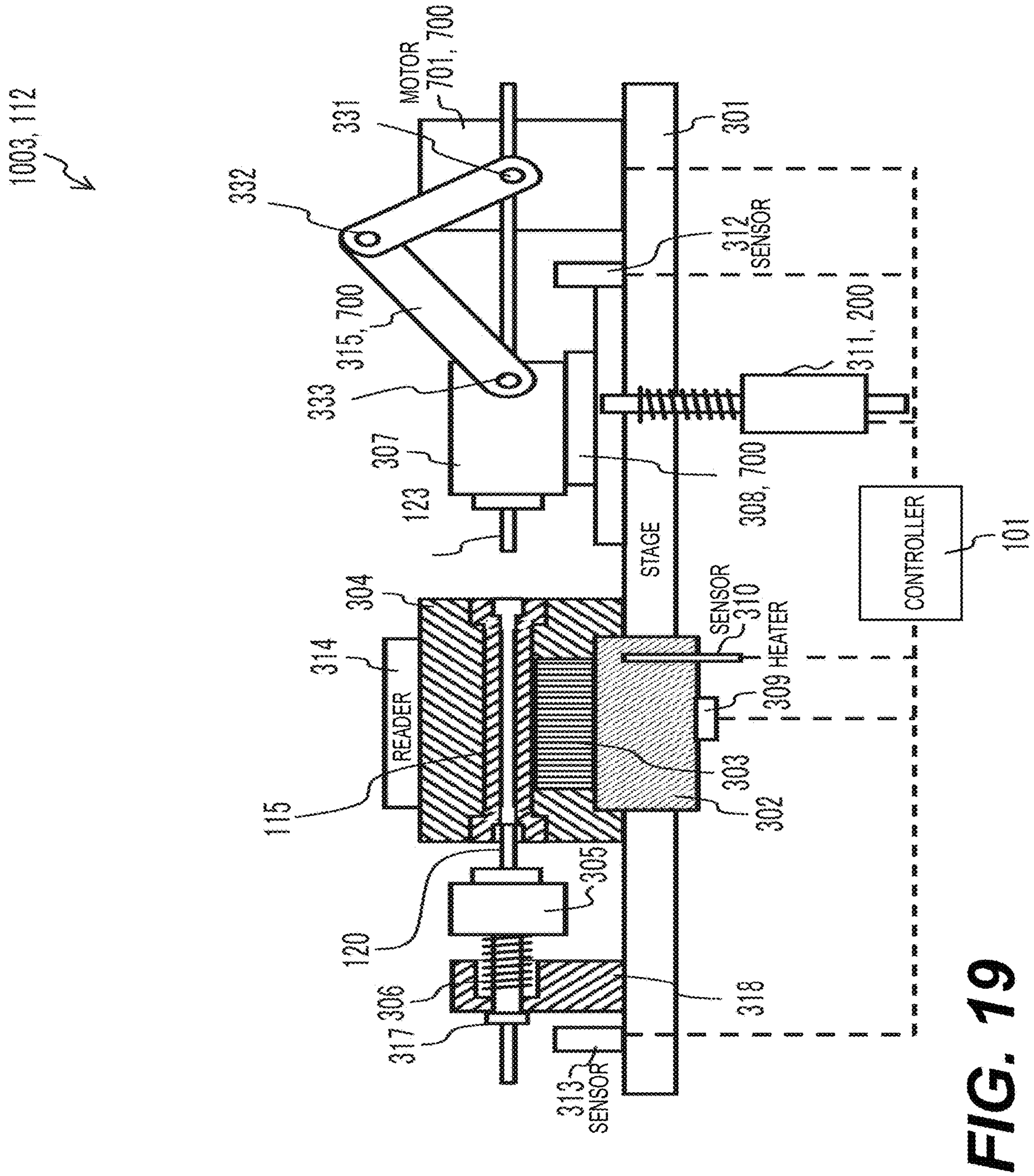
FIG. 19 is a diagram showing the separation column when removed in a state in which lock is released, and shows a state in which the analysis flow passage is slid in the liquid chromatograph according to the fourth embodiment.
Figure 20:
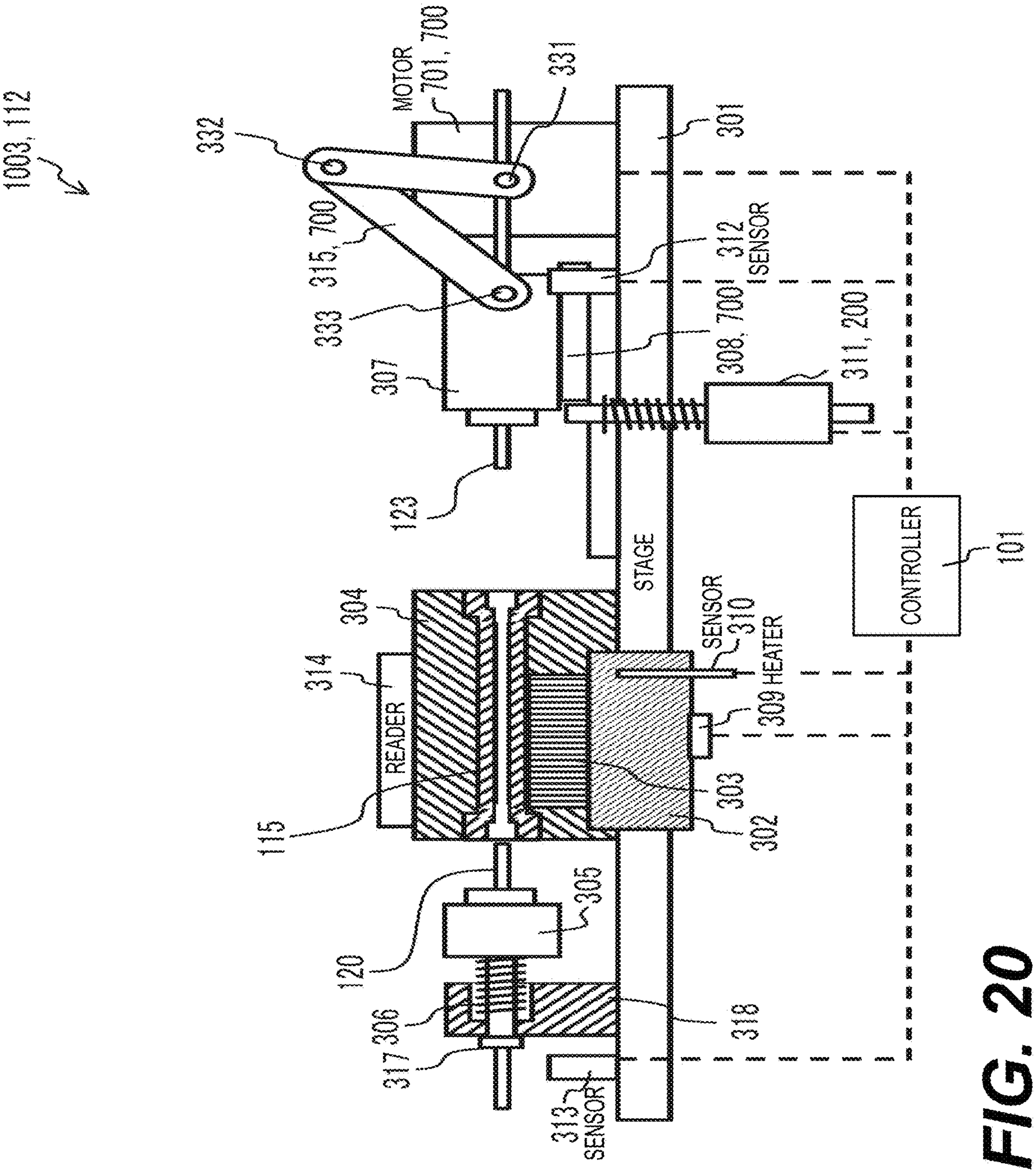
FIG. 20 is a diagram showing removal of the separation column, and shows a state in which the analysis flow passage is locked in a state in which the connection is released in the liquid chromatograph according to the fourth embodiment.

FIG. 19 is a diagram that explains the removal of the separation column 115 in the liquid chromatograph 1003 according to the fourth embodiment, in which the analysis flow passage 123 is slid while the lock is released. When locking by the lock mechanism 200 is released, the rotation driving shaft (not shown) is rotated by turning on the power to the motor body 702 and the analysis flow passage 123 integrated with the linear motion guide 308 slides toward the separation column 115.

FIG. 20 is a diagram that explains the removal of the separation column 115 in the liquid chromatograph 1003 according to the fourth embodiment, in which the analysis flow passage 123 is locked in a state that the connection is released. Since the solenoid lock 311 protrudes on the separation column 115 side of the linear motion guide 308, the linear motion guide 308 is restricted from sliding toward the separation column 115.

In the motor shown in FIG. 11 of the above Patent Literature 1, the rotation driving shaft can rotate when the power is off. However, according to the liquid chromatograph 1003 in the fourth embodiment, the solenoid lock 311 can be used to restrict sliding of the motor to perform locking.

It should be noted that the present invention is not limited to the examples described above, and includes various modification examples. For example, the examples described above have been described in detail to simply describe the present invention, and are not necessarily required to include all the described configurations. In addition, part of the configuration of one example can be replaced with the configurations of other examples, and in addition, the configuration of the one example can also be added with the configurations of other examples. In addition, part of the configuration of each of the examples can be subjected to addition, deletion, and replacement with respect to other configurations.

REFERENCE SIGN LIST

1, 2, 3: stream
100, 1001, 1002, 1003: liquid chromatograph (analyzer)
101: control device
102: display device (notification device)
1021: input device
103, 104, 105: separation unit
106, 107, 108: liquid delivery pump
109, 110, 111: sample injection valve
112, 113, 114: connection unit
115, 116, 117: separation column
118: flow passage switching valve

119: mass spectrometer
120, 121, 122, 123, 124, 125: analysis flow passage
200: lock mechanism
201, 202, 203: LED switch (notification device)
301: stage
302: heat block
303: column heat block
304: column cartridge
305, 307: fitting holder
306: compression spring
308: linear motion guide
309: heating device
310: temperature sensor
311: solenoid lock (lock mechanism)
312: open detection sensor (second sensor)
313: connection detection sensor (first sensor)
314: reading device
315: crank arm
316: lever
317: shaft
318: support base
331, 332, 333: rotation shaft
601: medium
700: slide mechanism
701: motor
702: motor body
703: shaft fixing mechanism (lock mechanism)

The invention claimed is:

1. An analyzer, comprising:
a plurality of separation columns that are connected in parallel and are removable;
a plurality of analysis flow passages that are respectively connected to the plurality of separation columns and configured to allow a sample to flow through each of the plurality of separation columns;
a lock mechanism that is configured to restrict removal of the separation columns other than the separation column to be removed;
a control device that is configured to control the lock mechanism;
a first sensor configured to detect connection of the analysis flow passage to a first end of the separation column; and
a second sensor configured to detect disconnection of the analysis flow passage from a second end of the separation column, wherein
the control device performs the restriction by the lock mechanism at a time of detection by either the first sensor or the second sensor, and
the control device releases the restriction by the lock mechanism by using detection of an end of an analysis in the separation column as a trigger.

2. The analyzer according to claim 1, further comprising:
a heating device configured to heat the separation column, wherein
the control device is configured to release the restriction by the lock mechanism when a temperature of the separation column is equal to or lower than a predetermined value.

3. The analyzer according to claim 1, wherein
the control device is configured to release the restriction by the lock mechanism when an internal pressure of at least one of the analysis flow passage and the separation column is equal to or less than a predetermined value.

4. The analyzer according to claim 1, further comprising:
a notification device configured to make a notification of a removable separation column among the plurality of separation columns.

5. The analyzer according to claim 1, further comprising:
a reading device configured to read information recorded on a medium including information for identifying the installed separation column.

6. An analyzer, comprising:
a plurality of separation columns that are connected in parallel and are removable;
a plurality of analysis flow passages that are respectively connected to the plurality of separation columns and configured to allow a sample to flow through each of the plurality of separation columns;
a lock mechanism that is configured to restrict removal of the separation columns other than the separation column to be removed; and
a control device that is configured to control the lock mechanism, wherein
connection between the separation column and the analysis flow passage is released by releasing the lock mechanism,
the analysis flow passages are connected to one end and the other end of the separation column, respectively,
the analyzer further comprises:
a first sensor configured to detect connection of the analysis flow passage to the one end side; and
a second sensor configured to detect disconnection of the analysis flow passage to the other end side, and
the control device performs the restriction by the lock mechanism at a time of detection by either the first sensor or the second sensor.

7. The analyzer according to claim 6, further comprising:
a slide mechanism configured to connect the separation column and the analysis flow passage by a slide of one placed structure with respect to other structure among structures that are the separation columns or the analysis flow passages, wherein
the lock mechanism restricts the slide of the other structure.

8. The analyzer according to claim 7, wherein
the lock mechanism is further configured to restrict the slide of the other structure in a state in which the connection between the separation column and the analysis flow passage is released.

9. The analyzer according to claim 8, further comprising:
an input device connected to the control device and configured to release restriction of the slide by being operated in a state in which the separation column is placed.

10. The analyzer according to claim 7, wherein
the slide mechanism
is configured to slide the other structure, and
includes a motor connected to the other structure.

11. The analyzer according to claim 10, wherein
the motor includes
a motor body configured to rotate a rotation drive shaft, and
a shaft fixing mechanism, as the lock mechanism, configured to fix the rotation drive shaft when the motor body is not energized.

12. The analyzer according to claim 7, wherein
the slide mechanism
is configured to slide the other structure, and
includes a lever configured to slide the other structure by an operation of a user.

13. A control method for an analyzer, comprising:

a lock step of restricting, by a lock mechanism, removal of separation columns other than a separation column to be removed among a plurality of separation columns that are connected in parallel and are removable;

releasing the restriction by the lock mechanism by using detection of an end of an analysis in the separation column as a trigger;

detecting, by a first sensor, connection of the analysis flow passage to a first end of the separation column; and detecting, by a second sensor, disconnection of the analysis flow passage from a second end of the separation column;

wherein the restriction by the lock mechanism is performed at a time of detection by either the first sensor or the second sensor.

* * * * *